(12) United States Patent
Beausoleil et al.

(10) Patent No.: US 7,532,785 B1
(45) Date of Patent: May 12, 2009

(54) PHOTONIC INTERCONNECTS FOR COMPUTER SYSTEM DEVICES

(75) Inventors: Raymond G. Beausoleil, Redmond, WA (US); Marco Fiorentino, Mountain View, CA (US); Norman Paul Jouppi, Palo Alto, CA (US); Nathan Lorenzo Binkert, Redwood City, CA (US); Robert Samuel Schreiber, Palo Alto, CA (US); Qianfan Xu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/975,974

(22) Filed: Oct. 23, 2007

(51) Int. Cl.
 *G02B 6/12* (2006.01)
(52) U.S. Cl. .................. 385/14; 385/8; 385/9; 385/123
(58) Field of Classification Search .................. 385/14, 385/8, 9, 123
 See application file for complete search history.

(56) References Cited

U.S. PATENT DOCUMENTS

| 6,636,668 | B1 | 10/2003 | Al-Hemyari et al. |
| 6,934,450 | B2 * | 8/2005 | Hiramatsu ............ 385/52 |
| 2008/0151950 | A1 * | 6/2008 | Lin et al. .............. 372/23 |

* cited by examiner

*Primary Examiner*—Jennifer Doan

(57) ABSTRACT

Various embodiments of the present invention are directed to photonic interconnects that can be used for on-chip as well as off-chip communications between computer system components. In one embodiment of the present invention, a photonic interconnect comprises a plurality of on-chip waveguides. Additionally, the photonic interconnect may include a plurality of off-chip waveguides, and at least one optoelectronic converter. The at least one optoelectronic converter can be photonically coupled to a portion of the plurality of on-chip waveguides, can be photonically coupled to a portion of the plurality of off-chip waveguides, and is in electronic communication with at least one computer system component.

19 Claims, 20 Drawing Sheets

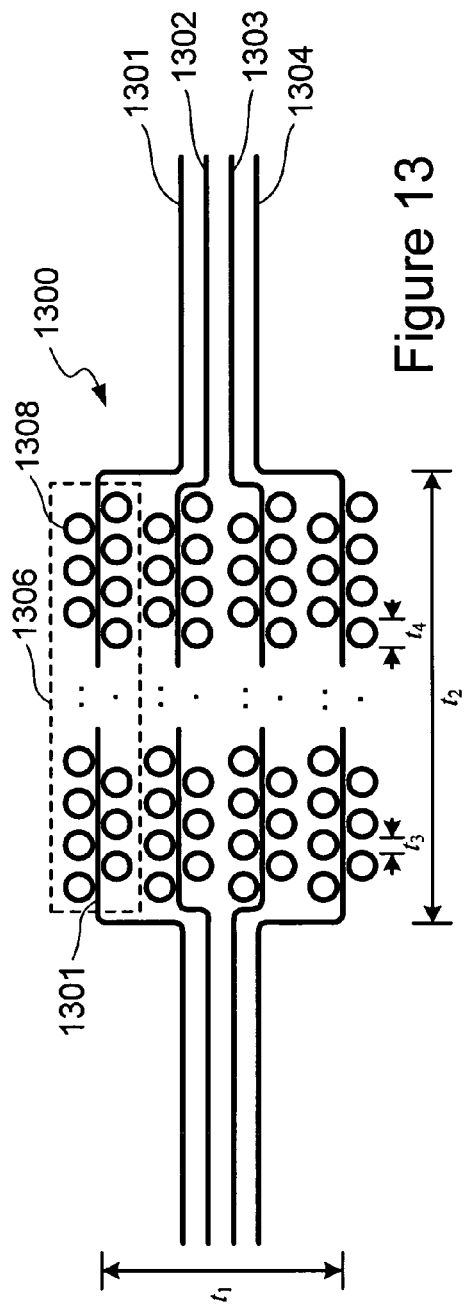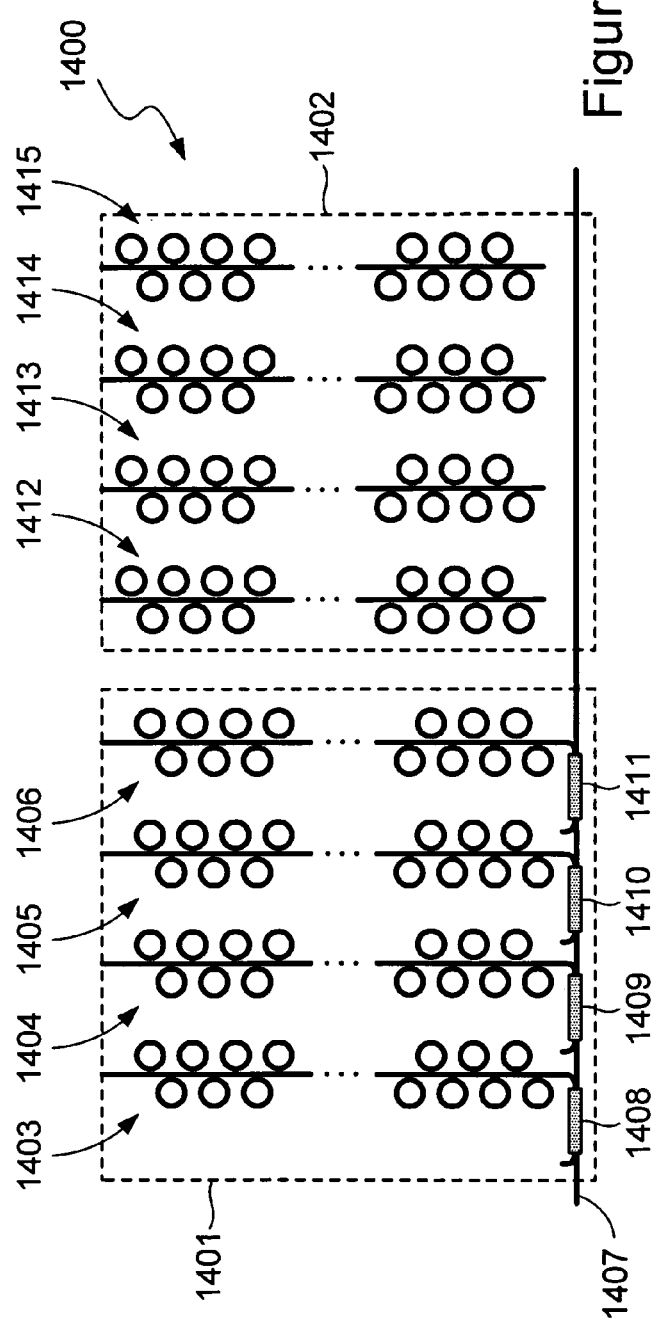

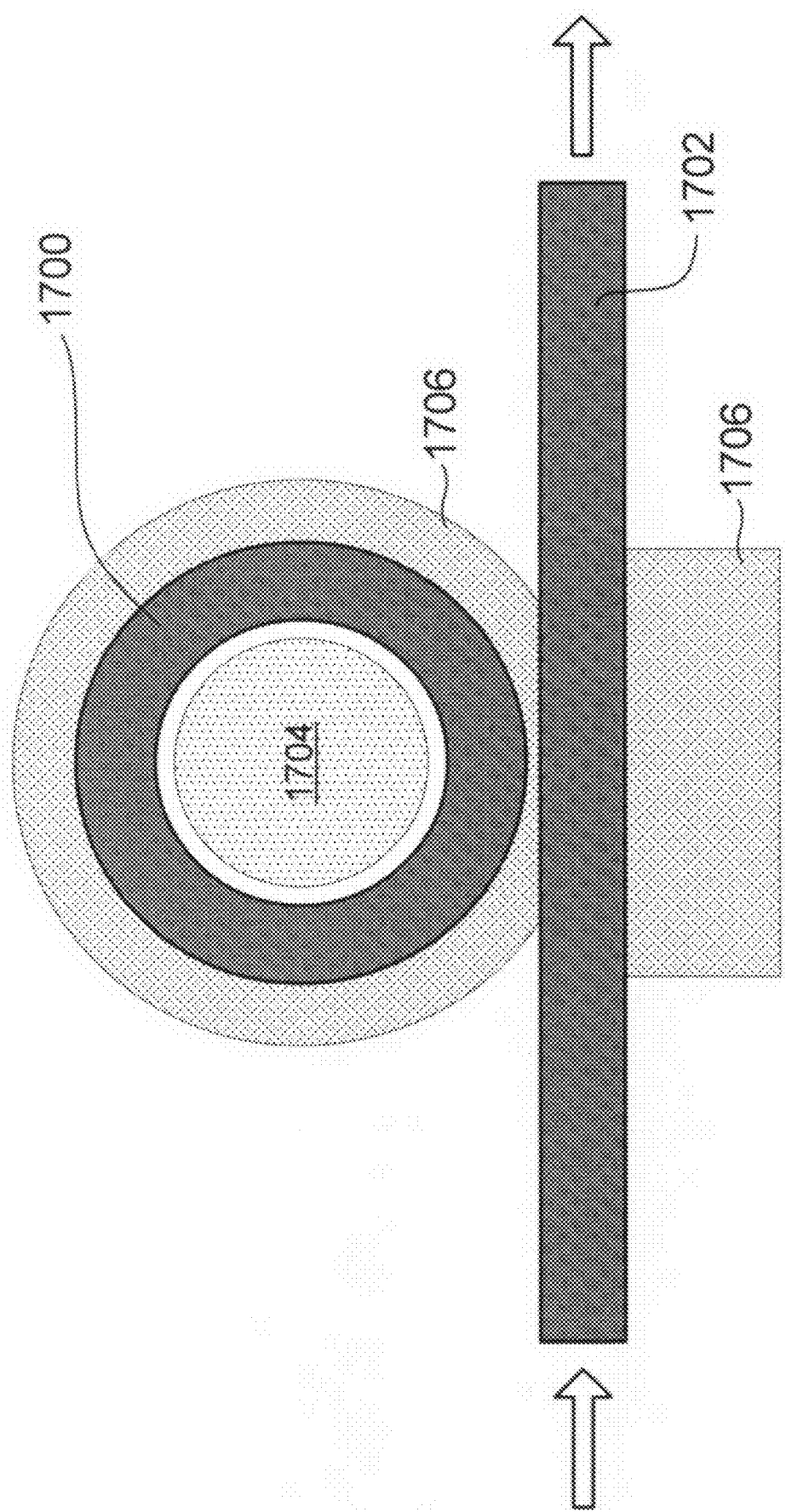

PHOTONIC INTERCONNECTS FOR COMPUTER SYSTEM DEVICES

TECHNICAL FIELD

Embodiments of the present invention are directed to photonic interconnects that can be used for on-chip as well as off-chip communications between computer system components in computer system devices.

BACKGROUND

In the mid 1960's, semiconductor manufacturers observed that the density of circuits, such as transistors, fabricated on integrated circuits was doubling about every 18 months. This trend has continued and is now termed "Moore's Law." The transistor density is viewed as a rough measure of computer processing power, which, in turn, corresponds to data processing speed. Although Moore's Law was originally made as an observation, over time Moore's Law has became widely accepted by the semiconductor industry as a fundamental driving force behind increasing computer processing power. As a result, semiconductor manufacturers have developed technologies for reducing the size of chip components to microscale and even nanoscale dimensions. Computer system architectures for computer systems (some examples of which are a memory module system, a single core processor device or a multi-core processor device) are encountering limitations while trying to keep up with Moore's law.

The multi-core system example illustrates some of the problems encountered. In recent years, the semiconductor industry has developed processors comprising two or more sub-processors, called "cores." For example, a dual-core processor contains two cores, and a quad-core processor contains four cores. Typically, the cores are integrated, share the same interconnects to the rest of the system, and can operate independently. Although semiconductor manufactures can increase the transistor density of a single core, semiconductor manufacturers have not moved in this direction due to inefficient power consumption. The alternative is to increase the number of cores packaged on a single die. A die is a single layer of semiconductor material on which an integrated circuit ("chip") is fabricated. However, on-chip and off-chip communication has emerged as a critical issue for sustaining performance growth for the demanding, data-intensive applications for which these multi-core chips are needed. Computational bandwidth scales linearly with the growing number of cores, but the rate at which data can be communicated across a multi-core chip using top-level metal wires is increasing at a much slower pace. In addition, the rate at which data can be communicated off-chip through pins located along the chip edge is also growing more slowly than compute bandwidth, and the energy cost of on-chip and off-chip communication significantly limits the achievable bandwidth. As a result, computer architecture is now at a cross roads and physicist and engineers are seeking alternatives to using metal wires for on-chip and off-chip communications.

SUMMARY

Various embodiments of the present invention are directed to photonic interconnects that can be used for on-chip as well as off-chip communications between computer system components. In one embodiment of the present invention, a photonic interconnect comprises a plurality of on-chip waveguides. Additionally, the photonic interconnect may include a plurality of off-chip waveguides, and at least one optoelectronic converter. The at least one optoelectronic converter can be photonically coupled to a portion of the plurality of on-chip waveguides and can be photonically coupled to a portion of the plurality of off-chip waveguides, and is in electronic communication with at least one computer system component.

BRIEF DESCRIPTION OF THE DRAWINGS

FIG. 13 shows a schematic representation of an enlarged bundled waveguide modulator/detector in accordance with embodiments of the present invention.

FIG. 14 shows an off-chip communications hub in accordance with embodiments of the present invention.

FIG. 17 shows a schematic representation of a microring in accordance with embodiments of the present invention.

DETAILED DESCRIPTION

Figure 1:
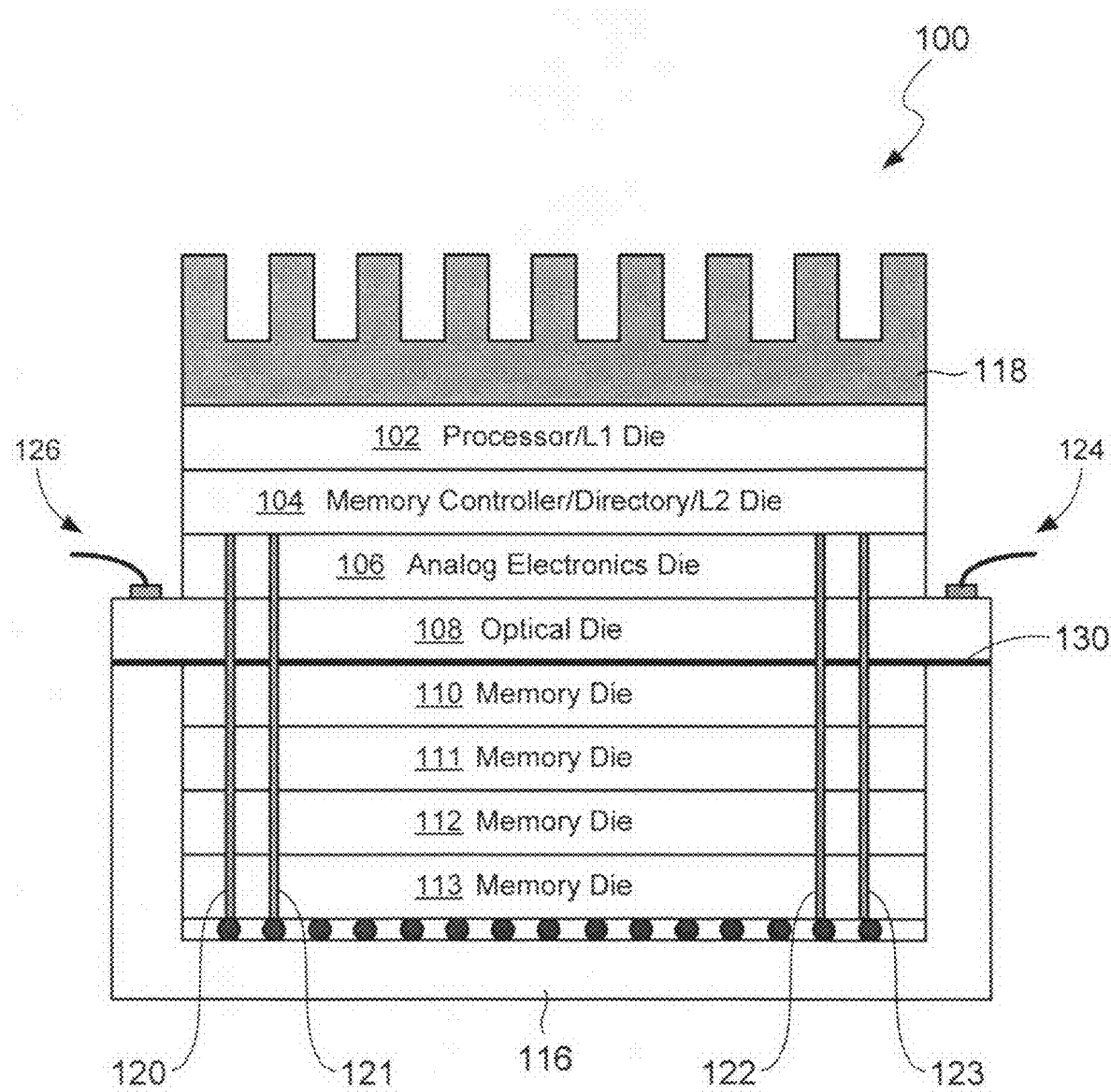
FIG. 1 shows a cross-sectional view of a stacked computational device in accordance with embodiments of the present invention.

Various embodiments of the present invention are directed to photonic interconnects. These photonic interconnects provide on-chip photonic interconnections between computer system components (e.g., cores, clusters, memory controllers). Additionally, some embodiments of the photonic interconnect provide as well off-chip photonic interconnections to computer system components on external devices. Embodiments of the present invention also include photonic interconnects which have nanophotonic components which include components with dimensions that are typically less than a wavelength, or less than a micron.

These photonic interconnects provide a faster rate at which data can be communicated off-chip than conventional pins located along the chip edge, provide a larger computational bandwidth, provide a lower energy cost for on-chip and off-chip communications than conventional metal wires, and can be scaled up or down to accommodate additional components, for example, a processor having any number of cores. Architectures of the photonic interconnect can be implemented with non-blocking, low-latency, reconfigurable nanophotonic microrings, offering a high bandwidth, modest latency, and very low power consumption even at peak computational bandwidths. In addition, the architectures of the computer system devices can be configured so that all memory is in close proximity to a memory controller or even the processor. A multi-core based computational device employing optical dies configured in accordance with embodiments of the present invention may operate at about 20 Tbytes/s.

In the following description, the terms "photonic" and "photonically" refer to devices that operate with classical and/or quantized ER having wavelengths that are not limited to just the visible portion of the electromagnetic spectrum. In the various photonic switch and switch fabric embodiments described below, a number of structurally similar components comprising the same materials have been provided with the same reference numerals and, in the interest of brevity, an explanation of their structure and function is not repeated.

Multi-Core, Stacked Computational Devices

FIG. 1 shows a cross-sectional view of an exemplary computer system device ("computational device") 100 which is a multi-core, stacked computational device employing a photonic interconnect in accordance with embodiments of the present invention. The computational device 100 comprises a processor die 102, a memory controller/directory/L2 die ("memory-controller die") 104, an analog electronic die 106, an optical die 108, and four stacked memory dies 110-113 stacked in a package 116. The stacked memory dies 110-113 can be volatile memory, such as dynamic random access memory ("DRAM"), non-volatile memory, or any combination of volatile and non-volatile memory. In particular, the stacked memory dies 110-113 can be 8 gigabyte ("GB") DRAM. The computational device 100 also includes a heat sink 118 positioned on the top surface of the processor die 102, and a large number of vias (e.g., hundreds), represented by four through vias 120-123, that extend from the memory-controller die 104 through the analog electronic die 106 and the optical die 108 to the four memory dies 110-113.

The dies 102, 104, 106, 108, and 110-113 can range in thickness from approximately 25 to approximately 50 microns. The heat sink 118 dissipates heat produced by computational operation of the processor die 102, and the through vias 120-123 can be metalized or silicon filled vias that electrically interconnect memory controllers in the memory die to each of the four memory dies 110-113. The memory controllers located within the memory-controller die 104 manage the flow of data going to and from the memory dies 110-113 and the flow of data going to and from external devices (not shown). The optical die 108 is larger that the other dies in order to include external photonic interconnects, such as external photonic interconnects 124 and 126, that can be used to transmit data encoded electromagnetic radiation to and from the computational device 100. The optical die can be approximately 24 mm by 24 mm, but the dimensions can be varied depending on the implementation. A diamond layer 130 may also be included between the bottom surface of the optical die 108 and the top surface of the memory die 110. The diamond layer 130 can be approximately 1-10 µm thick and can be used to spread out and dissipate heat produced by the processor die 102 and the memory-controller die 104.

The three-dimensional die stacking shown in FIG. 1 permits tight coupling of the optical die 108 with the electronic dies 102 and 104, provides accessibility of the memory dies 110-113 at low latency, and, by spreading the cluster logic and memory over stacked adjacent dies 102, 104, and 110-113, the electrical intra-cluster wiring is shortened over conventional devices. In particular, stacking the memory dies in close proximity to the memory controllers and using vias running through the memory layers provides shorter-length, lower-resistance interconnections than the considerably longer, higher-resistance interconnections used to connect conventional memory to memory controllers. As a result, the power, or load, needed to transmit electrical signals between dies of the computational device 100 is significantly lower than the power needed for conventional memory to memory controllers.

Figure 2:
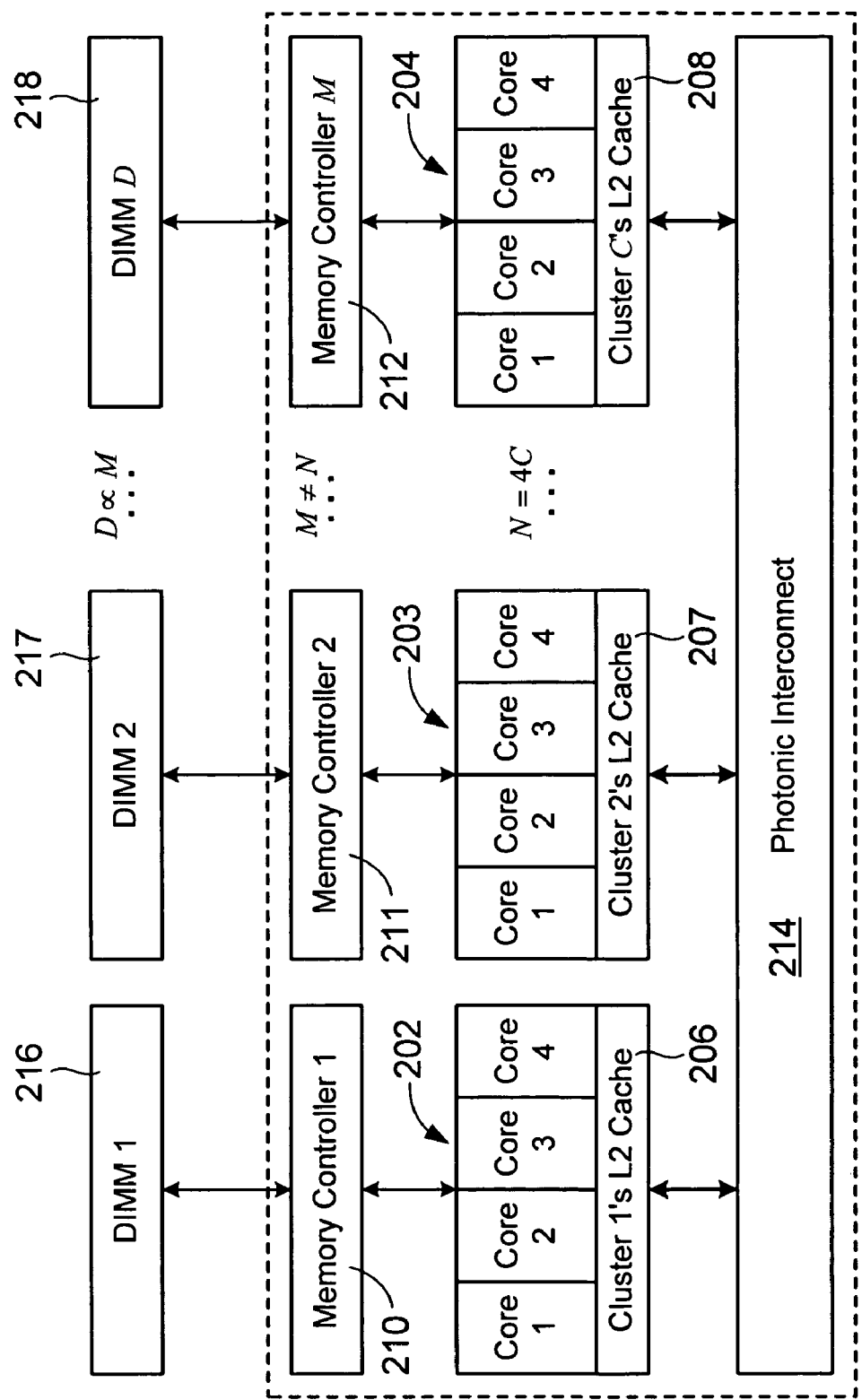
FIG. 2 shows a schematic representation of components of the computational device in accordance with embodiments of the present invention.

FIG. 2 shows a schematic representation of components of the dies 102, 104, and 108 of the computational device 100 interconnected in accordance with embodiments of the present invention. The processor die 102 is a multi-core processor where the cores can be arranged into clusters of four cores each, as represented by clusters 202-204. Each core has a private first level ("L1") instruction cache (not shown) and a private L1 data cache (not shown) described below with reference to FIG. 4. The clusters 202-204 each have a private shared second level ("L2") cache, represented by L2 caches 206-208, and an associated memory controller, represented by memory controllers 210-212. The memory controllers 210-212 control the flow of data to and from the clusters 202-204, respectively. The L2 caches and the memory controllers are located in the memory-controller die 104 adjacent to the processor die 102. As shown in FIG. 2, a photonic interconnect 214 of the optical die 108 provides photonic interconnections that enable the L2 caches 206-208 associated with the clusters 202-204 to photonically communicate with each other and with the memory controllers 210-212. Also, FIG. 2 reveals that the memory controllers 210-211 can photonically communicate with external memory modules, such as off-chip dual in-line memory modules ("DIMMs") 216-218. The clusters 202-204 can communicate electronically or photonically with the DIMMS 216-218, respectively.

Each cluster of the processor die 102 has a corresponding memory controller disposed on the memory controller die 104, each memory controller interfaces to the stacked memory dies 110-113 or drives a photonic connection to off-chip memory to provide bandwidth that scales with the processor die 102 performance. The clusters are also photonically coupled to each other through the optical die 108, offering high bandwidth, modest latency, and very low power consumption. Thus, a programmer with the stacked computational device 100 at his/her disposal can express parallelism at a high level, and is not burdened by issues of locality, which greatly reduces the difficulty of parallel program development. Furthermore, the computational device 100 architecture may provide bandwidth of one byte per flop to DRAM.

When 8 GB DRAM is selected for each of the memory dies 110-113, the on-stack memory provides 32 Gbytes of DRAM which is directly connected to the memory controllers through the multiple vias running through the DRAM, such as vias 120-123. The DRAM is provided by 4 memory stack layers, thinned to about 25 to 50 microns to minimize loading of, or the amount of power needed to use, the vias. Each layer of the DRAM stack includes 64 nearly identical regions which map onto the clusters in the processor die 102 above. Each DRAM region can be further subdivided into multiple banks that reduce the row access time, and allows multiple concurrent accesses. For example, using 20 nm DRAM technology each region may provide 1 Gbit of error correcting code protected storage, so that each memory controller in the memory-controller die 104 electronically connects to 0.5 Gbytes of memory. Multiple channels provide increased bandwidth into the memory. By providing increased bandwidth, bank conflicts in the DRAM are reduced. Each memory channel consists of 72 data bits and approximately 30 address and control bits. Using 25 micron pitch through vias the area overhead of the through vias may be less the 3% of the memory layer, assuming 4 channels per memory controller. Fine pitch through vias allow the DRAM to be structured to supply an entire cache line from a single row access.

When 512 GB DRAM is desired, it can be arranged into 64 separate optically connected memory modules ("OCM"). The OCMs exploit the same basic technology as the 8 GB DRAM described above. The optical die 108 performs two functions. First, the optical die 108 provides an interface to the optical fiber connections, such as external photonic interconnects 124 and 126. Second, the optical die 108 provides low power, global interconnect for the stack of DRAM. The OCMs and the processor are connected through optical fibers, which provides for as much as 48 channels that can be used for commands or other application-specific data exchanges.

Overall Operation of the Multi-Core, Stacked Computational Devices

For the sake of simplicity, photonic interconnection embodiments of the present invention are described below with reference to the computational device 100, wherein the processor die 102 comprises 64 quad-core clusters. It will be apparent to those skilled in the art that the photonic interconnect embodiments of the present invention are not limited to such devices and that these embodiments can be modified and implemented to provide photonic interconnections for multi-core computational devices having any number of clusters with any number of cores in various arrangements.

Figure 3:
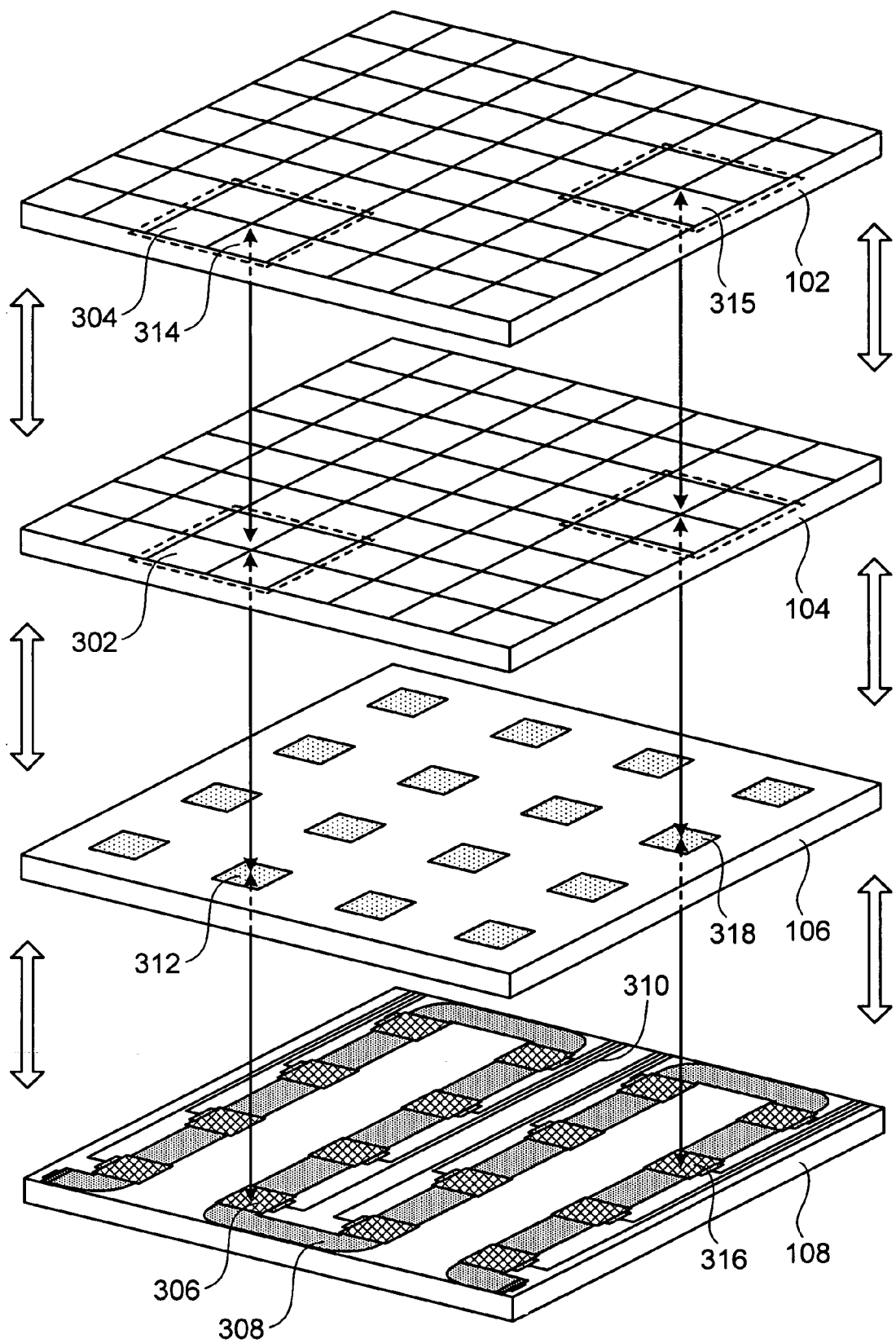
FIG. 3 shows an exploded isometric view of four die layers of the computational device, shown in FIG. 1, in accordance with embodiments of the present invention.

FIG. 3 shows an exploded isometric view of the photonic die 102, the memory-controller die 104, the analog electronic die 106, and the optical die 108 in accordance with embodiments of the present invention. As shown in FIG. 3, the processor die 102 and the memory-controller die 104 are partitioned into 64 tiles. Each tile in the processor die 102 represents four cores called "clusters," and each tile in the memory-controller die 104 represents an L2 cache, a hub, a memory controller, and other devices that are in electronic communication with a corresponding cluster located approximately directly above in the processor die 102. For example, tile 302 of memory-controller die 104 represents an L2 cache, a hub, a memory controller and other devices located beneath and in electronic communication with an associated cluster 304. The clusters and tiles can be approximately 3 mm by 3 mm, but can be made larger or smaller depending on the implementation. Embodiments of the present invention are not limited to clusters having four cores. In other embodiments, a cluster can be comprised two, three, and four or more cores. An example of a cluster and tile are described below with reference to FIGS. 4A-4B. The optical die 108 includes 16 approximately regularly spaced optoelectronic converters, such as optoelectronic converter 306, 270 separate and approximately parallel (non-crossing) waveguides having a serpentine configuration, represented by strip 308, that wind their way through each of the 16 regularly spaced optoelectronic converters, and 16 bundles of 8 approximately parallel waveguides, each bundle emanating from a corresponding optoelectronic converter, such as bundle 310 emanating from the optoelectronic converter 306. The 270 serpentine waveguides are called "on-chip waveguides" that provide photonic communication between optoelectronic converters, and the waveguides comprising the 16 bundles of waveguides are called "off-chip waveguides" that provide photonic communication with devices located outside the computational device 100. The 16 optoelectronic converters are each comprised of four optoelectronic converter blocks (not shown). Each of the optoelectronic converter blocks ("converter blocks") is in electronic communication with one of the four associated tiles in the memory-controller die 104. The converter blocks are described in greater detail below with reference to FIGS. 6 and 7. The analog electronic die 106 includes 16 patches, each patch is located between four tiles in the memory-controller die 104 and an optoelectronic converter in the optical die 108. Each patch comprises a number of metalized or silicon filled through vias that provide for analog electronic communication between the four tiles in the memory-controller die 104 and the corresponding optoelectronic converters. Data is transmitted through the patches in the form of electronic analog signals ("electrical signals") because producing analog signals typically consumes considerably less power than producing digital electrical signals.

The following description is an overview of how the optical die 108 can be used to transmit data between clusters on the processor die 102 and transmit data between clusters and external devices. Data generated by a cluster of the processor die 102, such as cluster 304, or extracted from a tile of the memory-controller die 104, such as tile 302, is transmitted as data encoded electrical signals through vias in a patch 312 to a corresponding converter block (not shown) of the optoelectronic converter 306. The converter block encodes the electrical signals into one or more wavelengths of electromagnetic radiation, called "channels," propagating in one or more of the on-chip waveguides 308. Encoding data into unmodulated channels can be accomplished by modulating the intensity of the channels, which is described in greater detail below with reference to FIG. 14. Channels carrying data are referred to as "encoded channels." The encoded channels can be destined for (1) a neighboring cluster 314, which is also in electronic communication with the same optoelectronic converter 306, (2) a cluster located elsewhere in the processor die 102 such as cluster 315, or (3) an external device (not shown). When the encoded channels are destined for the neighboring cluster 314, its corresponding converter block located within the optoelectronic converter 306 receives the encoded channels and converts them back into encoded electrical signals that are transmitted back through the patch 312 to the cluster 314. When the data encoded channels are destined for the cluster 315, the encoded channels are transmitted along appropriate on-chip waveguides to a converter block corresponding to the cluster 315 located with an optoelectronic converter 316. The encoded channels are converted back into encoded electrical signals that are transmitted through a patch 318 to the cluster 315. When the encoded channels are destined for an external device, the converter block of the optoelectronic converter 306 places the encoded channels onto off-chip waveguides of the bundle 310 where the encoded channels exit the optical die 108. When an external device generates encoded channels destined for one of the four clusters 314, the encoded channels can be transmitted along the off-chip waveguides in the bundle 310 to the optoelectronic converter 306 where the encoded channels are converted into encoded electrical signals that are transmitted through the patch 312 to the four clusters 314 for processing. A more detailed description of the operation and components of the optical die 108 is provided below with reference to FIG. 7.

Clusters and Memory Controllers

Figure 4A:
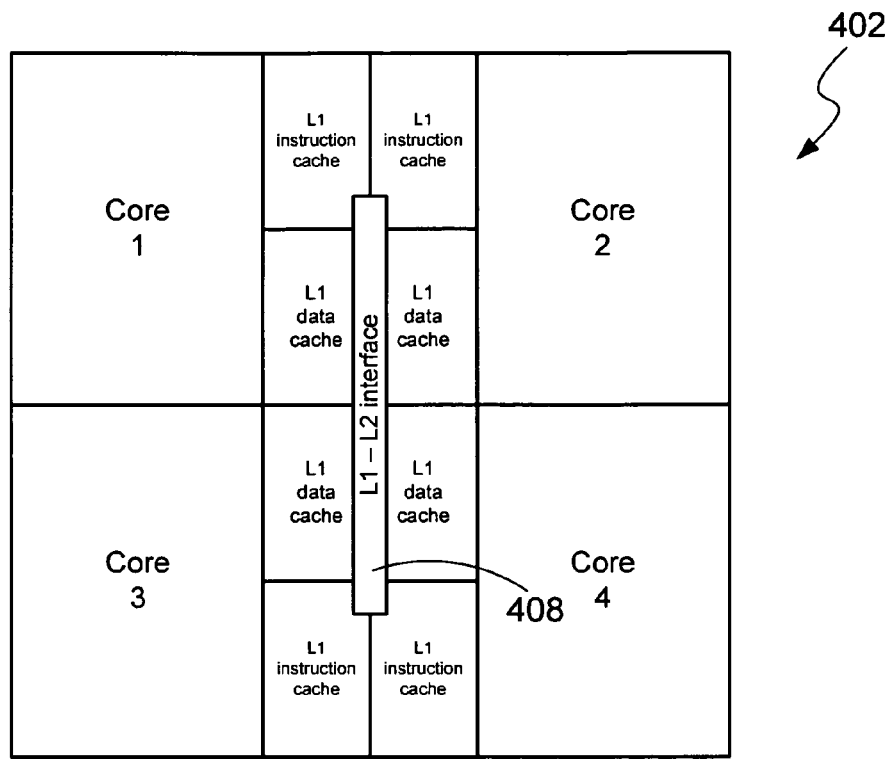
FIG. 4A shows a cluster of a processor die in accordance with embodiments of the present invention.
Figure 4B:
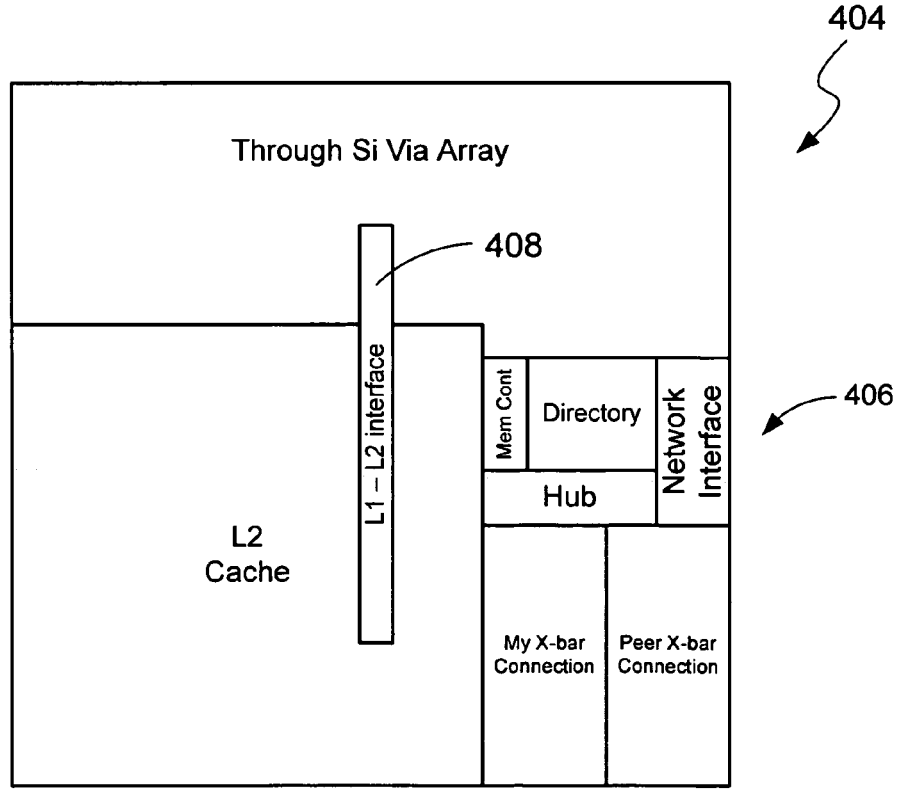
FIG. 4B shows of a tile of a memory die in accordance with embodiments of the present invention.

FIG. 4A shows a cluster 402 of the processor die 102 in accordance with embodiments of the present invention. The cluster 402 comprises four cores. Each core is in electrical communication with an L1 instruction cache and an L1 data cache. An L1 instruction cache and an L1 data cache are high speed random access memory that temporarily store frequently or recently accessed instructions and data. FIG. 4B shows a tile 404 of the memory-controller die 104 in accordance with embodiments of the present invention. The tile 404 includes an L2 cache and a component region 406 comprising a hub, a memory controller, directory, network interface, a my crossbar connection, and a peer crossbar connection. These crossbar connections may be configured to interface with corresponding portions of the optoelectronic converters. The L2 cache is shared by the four cores of the cluster 402. An L1-L2 interface 408 is positioned in approximately the center of the cluster 402 and the tile 404 and provides electronic communication between the cluster 402 and the tile 404.

Small, power efficient cores and caches achieve near optimal possible performance per unit of energy. Therefore, the cores selected for the present invention can use a 5 GHz clock, and the cores can be dual-issue, in-order, and multithreaded and may be configured to offer single instruction multiple data ("SIMD") instructions allowing 4 multiply-accumulate and 4-word-wide load/store operations. SIMD can be a collection of low-level functions designed to accelerate floating-point performance. The SIMD process enables one instruction to perform the same function on multiple pieces of data reducing the number of loops required to handle data. With just 64 quad clusters, as described above with reference to FIG. 3, that operate in accordance with a 5 GHz clock, the compute bandwidth of the computational device 100 may be 10 Tflops/s. Each cluster may send at least one cache line, such as 64 to 128 bytes, during 24-clock-cycles called "epochs."

Figure 5:
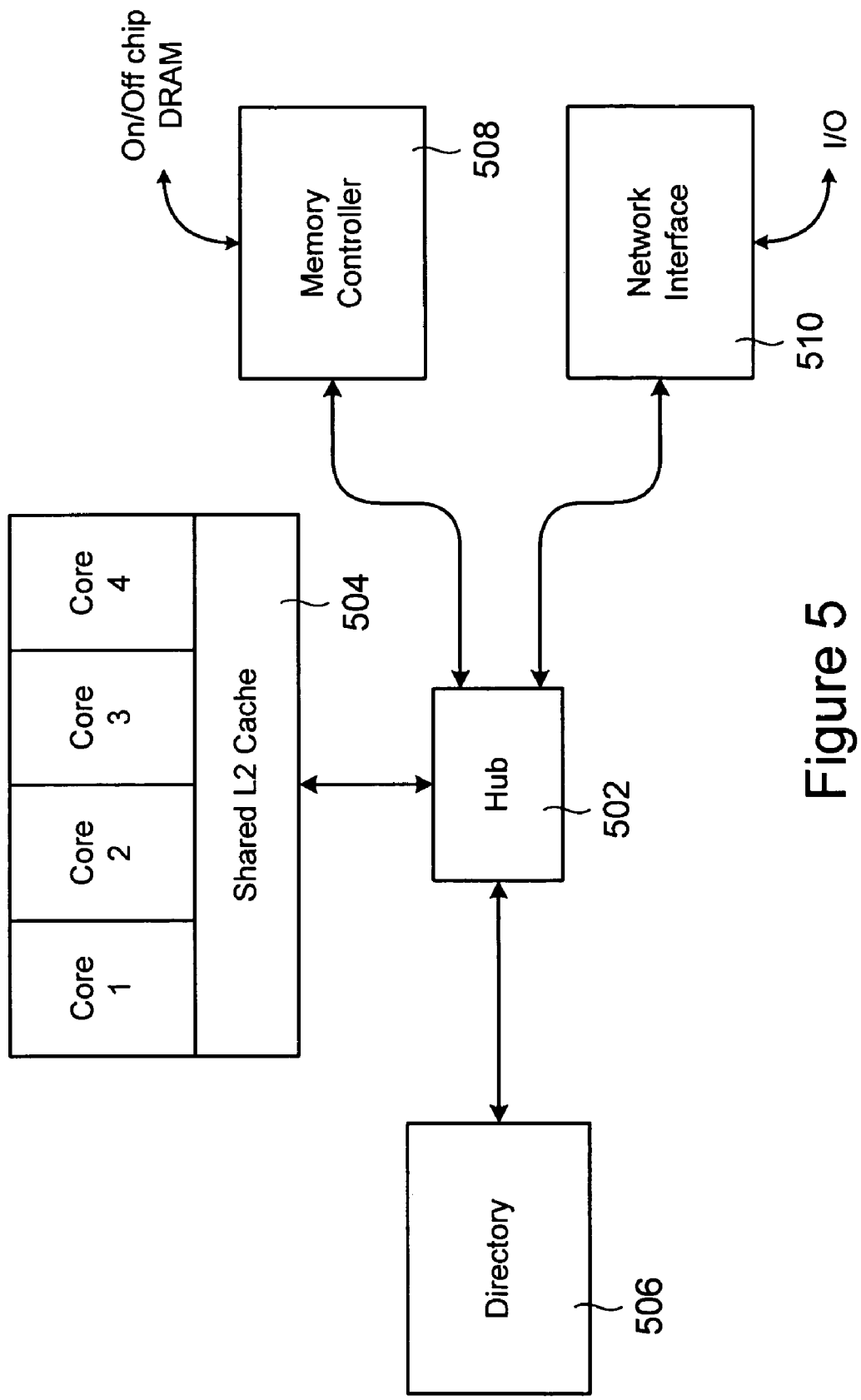
FIG. 5 shows a schematic representation of interactions between components of the cluster and tile shown in FIGS. 4A-4B in accordance with embodiments of the present invention.

FIG. 5 shows a schematic representation of interactions between components of the cluster and tile shown in FIGS. 4A-4B in accordance with embodiments of the present invention. The hub 502 distributes encoded electrical signals to the L2 cache 504, the directory 506, the memory controller 508, and the network interface 510. The hub 502 is also responsible for transmitting encoded electrical signals to and from the optoelectronic converter of the optical die 108, as described above with reference to FIG. 3. The network interface 510 provides connections to an external network, and the memory controller 508 manages the flow of data going to and from the L2 cache 504, the memory 110-113 shown in FIG. 1, and external memory, such as the DIMMs 216-218 shown in FIG. 2.

Figure 6:
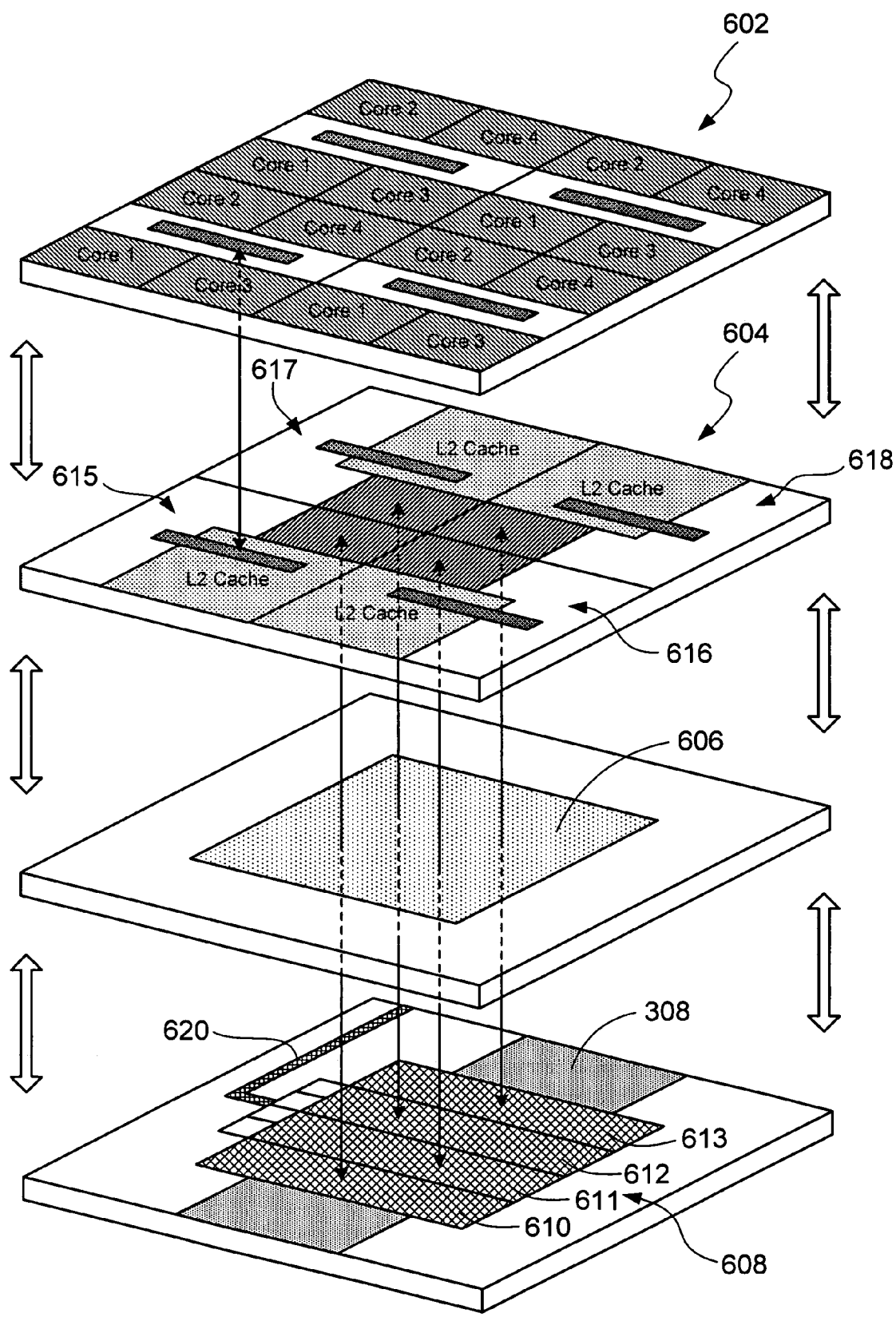
FIG. 6 shows an enlarged, exploded isometric view of the four die layers of the computation device, shown in FIG. 1, in accordance with embodiments of the present invention.

FIG. 6 shows an enlarged, exploded isometric view of four clusters 602 of the processor die 102, four corresponding tiles 604 of the memory-controller die 104, a patch 606 of the analog electronic die 106, and an optoelectronic converter 608 of the optical die 108 arranged in accordance with embodiments of the present invention. As shown in FIG. 6, the optoelectronic converter 608 comprises four individual optoelectronic converter blocks 610-613. Each converter block is in electronic communication with one of the four tiles 604 via the patch 606. In particular, tile 615 is in electronic communication with the converter block 610, tile 616 is in electronic communication with the converter block 611, tile 617 is in electronic communication with the converter block 612, and tile 618 is in electronic communication with the converter block 613. The converter blocks 610-613 convert encoded electrical signals output from the tiles 615-618, respectively, into encoded channels that can be transmitted on a portion of the on-chip waveguides 308 for processing by other clusters or transmitted on a bundle of waveguides 620 to external devices for processing. The converter blocks 610-613 also convert encoded channels transmitted in the bundle 620 and the on-chip waveguides 308 into encoded electrical signals that can be processed separately by the four clusters 602.

Optical Die

Figure 7A:
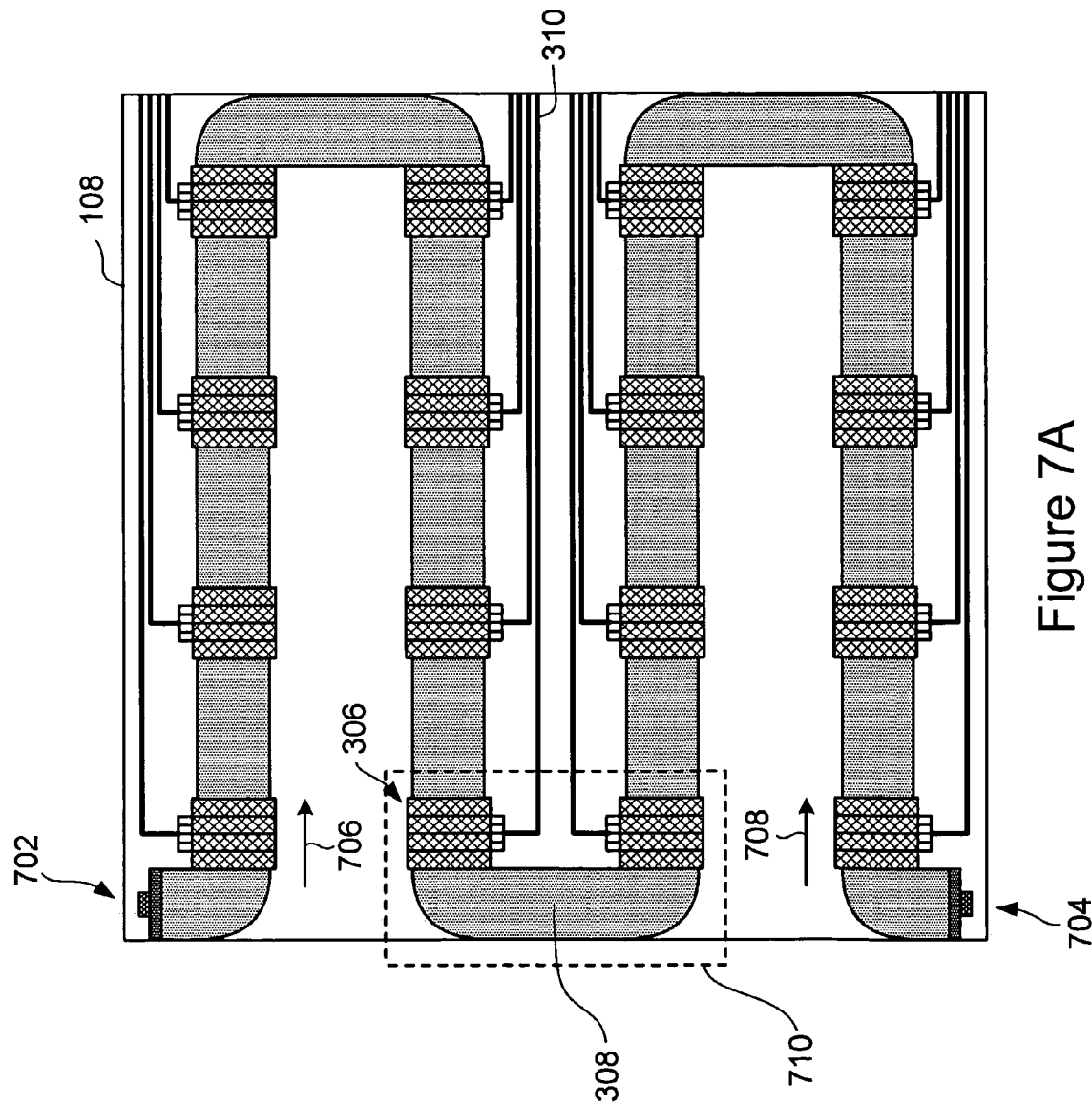
FIG. 7A shows a schematic representation of an optical die in accordance with embodiments of the present invention.

FIG. 7A shows a schematic representation of the optical die 108 in accordance with embodiments of the present invention. As shown in FIG. 7A, and as described above with reference to FIG. 3, the optical die 108 includes 270 separate, approximately parallel, non-intersecting, on-chip waveguides 308, 16 approximately regularly spaced optoelectronic converters, and 16 bundles of 8 off-chip waveguides. The on-chip waveguides 308 can be disposed in a serpentine configuration so that all 270 on-chip waveguides 308 can be photonically coupled to each of the 16 optoelectronic converters. FIG. 7A reveals that each optoelectronic converter comprises four converter blocks. In other words, the optical die 108 includes 64 converter blocks that are each in communication with one of the 64 tiles of the memory-controller die 104. FIG. 7A also reveals two, substantially identical, channel sources 702 and 704 positioned at opposite ends of the serpentine on-chip waveguides 308. The sources 702 and 704 are each configured to output the same set of 64 different channels onto each of the on-chip waveguides in opposite directions. Directional arrow 706 represents the direction channels output from the source 702 are transmitted, and directional arrow 708 represents the direction channels output from the source 704 are transmitted. The serpentine on-chip waveguides 308 have a width of approximately 1900 μm.

Embodiments of the present invention are not limited to on-chip waveguides having the serpentine shape shown in FIG. 7A. The configuration of the on-chip waveguides may assume any suitable shape that may depend on the number of optoelectronic converters, the layout of the optoelectronic converters, and the amount of space available on the optical die.

Figure 7B:
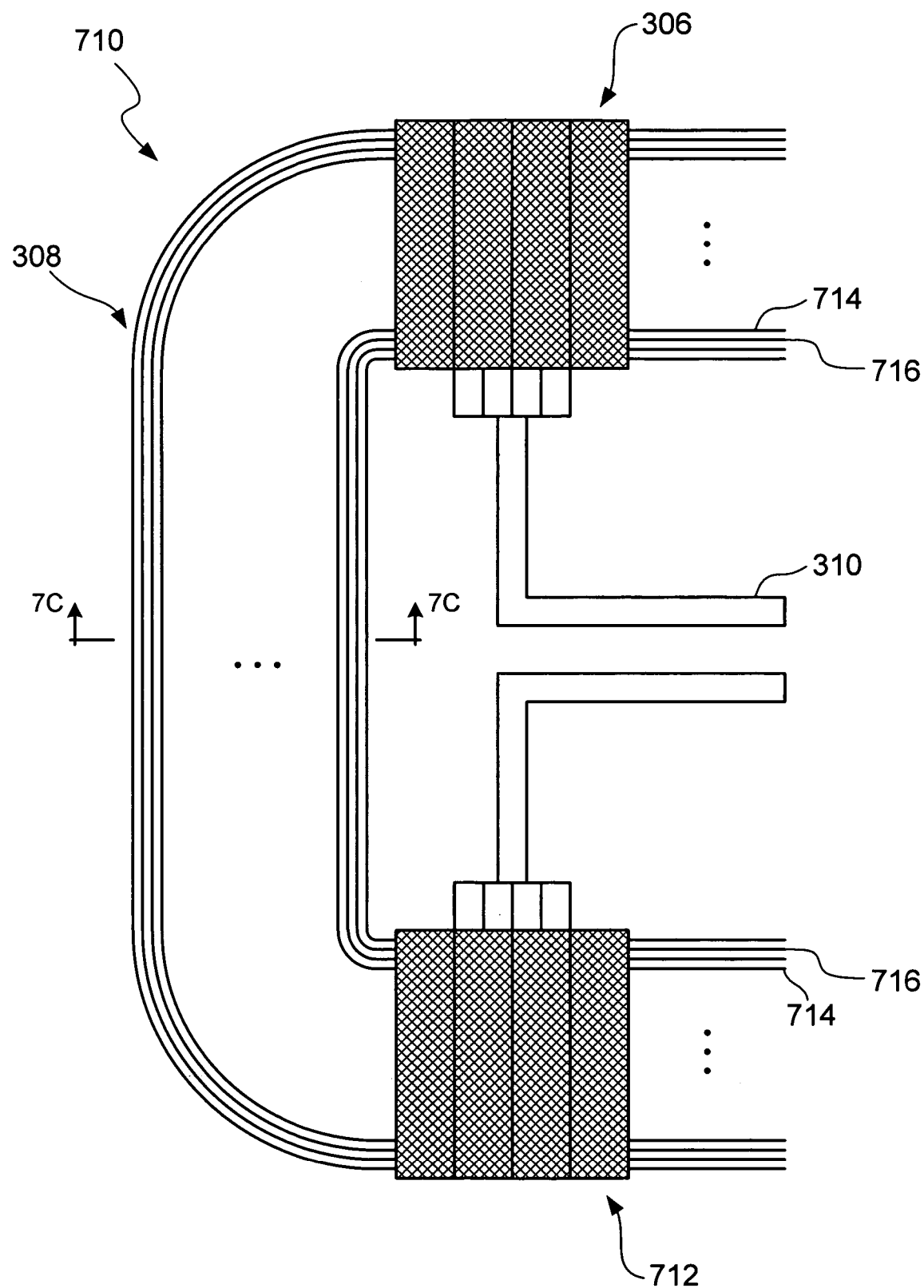
FIG. 7B shows an enlargement of a region of the optical die, shown in FIG. 7A, in accordance with embodiments of the present invention.

FIG. 7B shows an enlargement of a region 710, shown in FIG. 7A, of the optical die 108 in accordance with embodiments of the present invention. As shown in FIG. 7B, for the sake of simplicity of illustration, only 8 of the 270 serpentine on-chip waveguides 308 are displayed. FIG. 7B reveals that the waveguides do not intersect and are approximately parallel, such as waveguides 714 and 716.

Figure 7C:
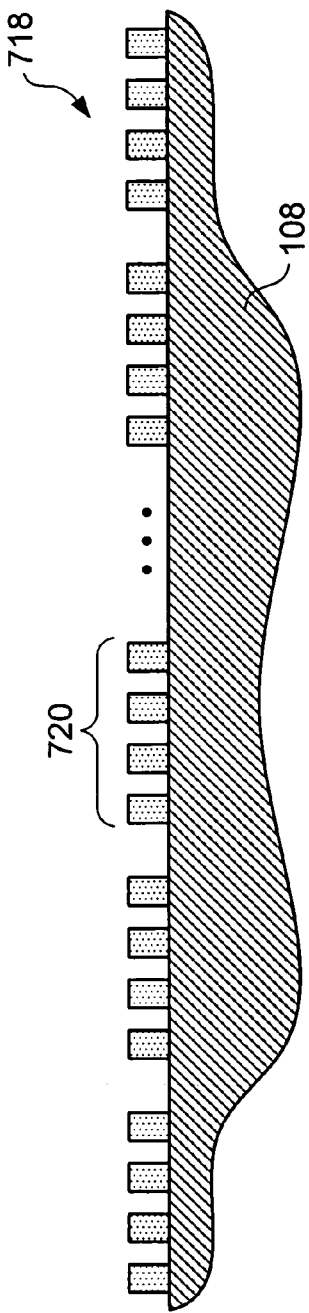
FIG. 7C shows a cross-sectional view of a portion of on-chip ridge waveguides along a line 7C-7C, shown in FIG. 7B, in accordance with embodiments of the present invention.

The on-chip waveguides 308 can be ridge waveguides or photonic crystal waveguides with cross-sectional dimensions ranging from about 0.25 to about 0.5 microns FIG. 7C shows a cross-sectional view of a portion 718 of the on-chip ridge waveguides 308 along a line 7C-7C, shown in FIG. 7B, in accordance with embodiments of the present invention. For the sake of simplicity of illustration, the portion 718 of on-chip ridge waveguides represents 20 of the 270 on-chip ridge waveguides disposed on the surface of the optical die 108. As shown in FIG. 7C, the ridge waveguides are disposed in bundles, each bundle having 4 waveguides, such as bundle 720.

Figure 7D:
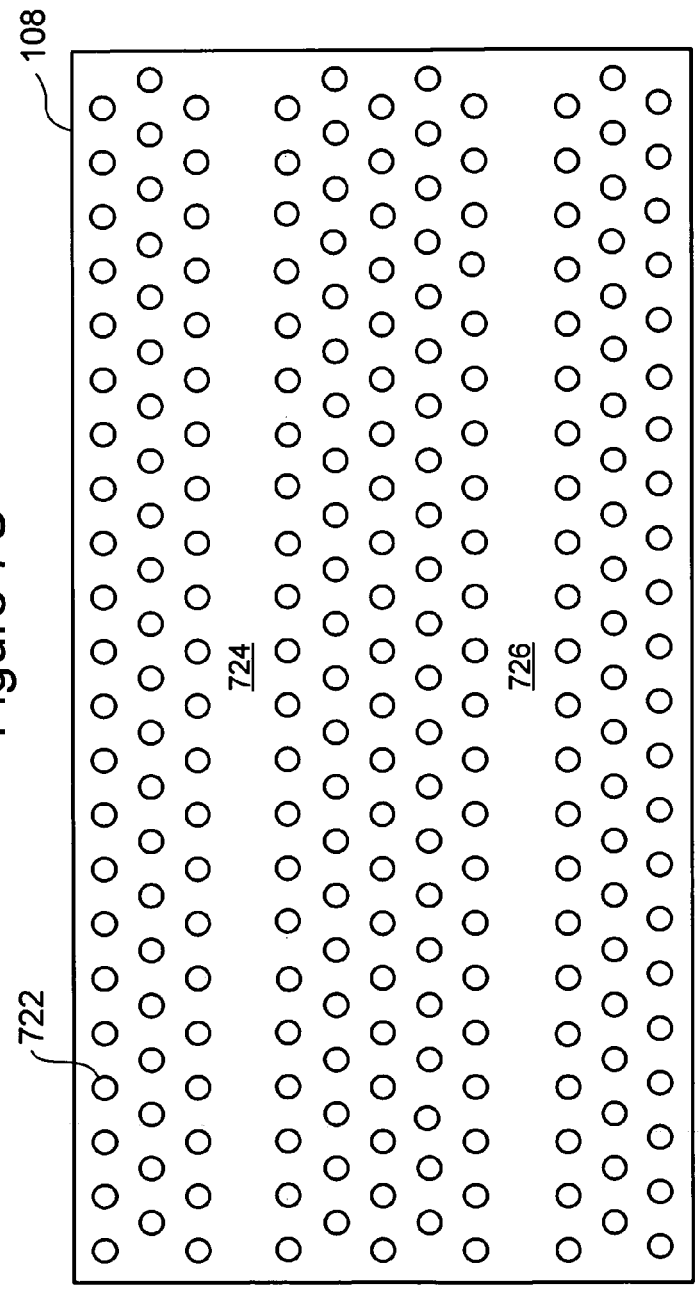
FIG. 7D shows a top view of a portion of two approximately parallel photonic crystal waveguides in accordance with embodiments of the present invention.

FIG. 7D shows a top view of a portion of two approximately parallel photonic crystal waveguides in accordance with embodiments of the present invention. In FIG. 7D, circles, such as circle 722, represent a regular lattice of openings in a dielectric or semiconductor substrate layer of the optical die 108. Regions without openings are photonic crystal waveguides 724 and 726. The openings can be filled with air or a suitable dielectric material having a refractive index that is lower than that of the substrate layer. The regular lattice of openings creates a two-dimensional Bragg grating surrounding the waveguides 724 and 726. This two-dimensional Bragg grating confines ER of an appropriate wavelength to the waveguides 724 and 726. Photonic crystal waveguides are well-known, and the textbooks *Fundamentals of Optical Waveguides*, by Katsunari Okamoto, Elsevier Inc. 2005; *Optical Waveguide Theory*, by Snyder and Love, Chapman and Hall, London, 1983; and *Photonic Crystals*, by Jean_Michel Lourtioz, Springer-Verlag, Berlin, 2005 are just three of many references in this field.

Figure 8:
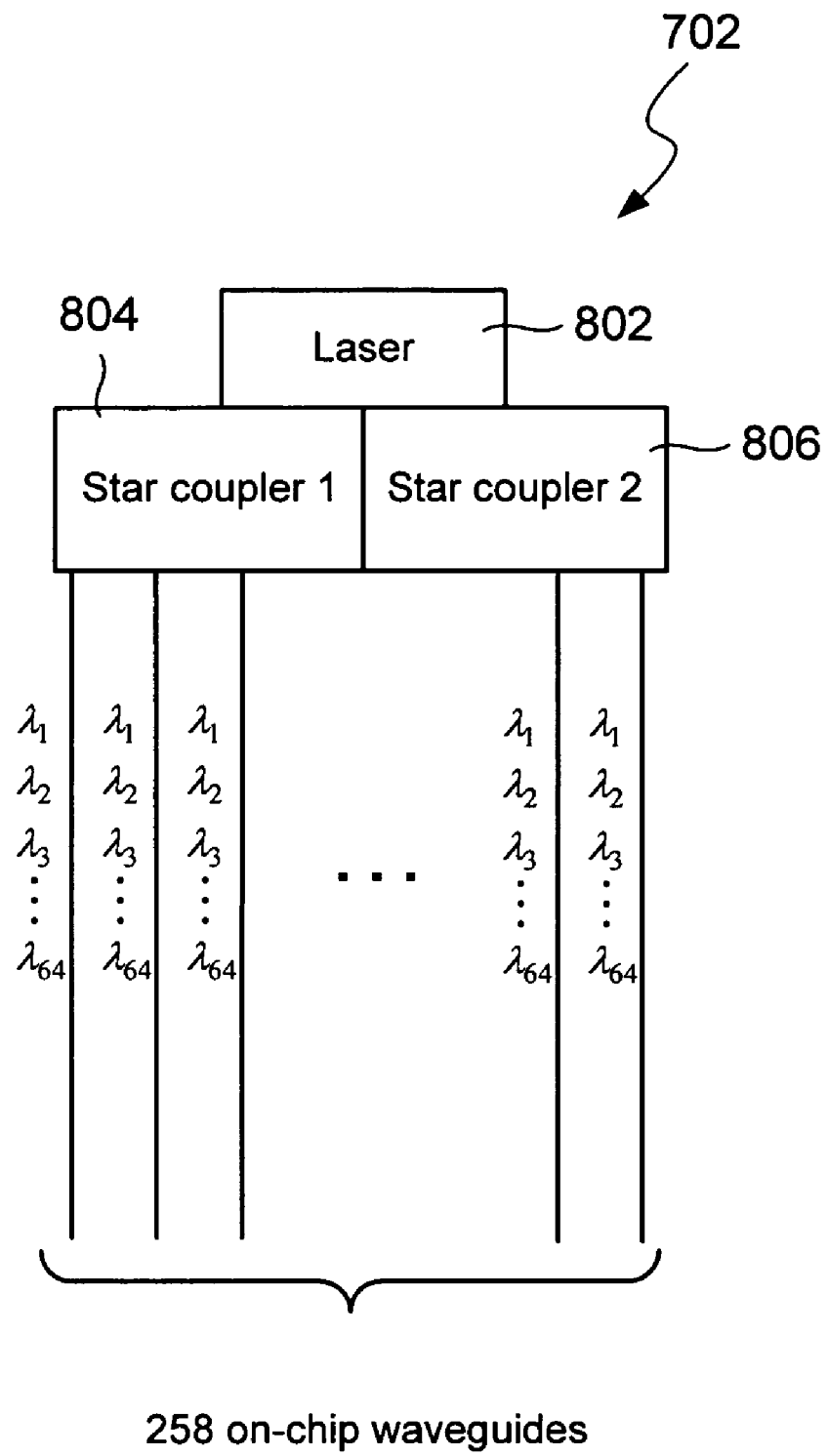
FIG. 8 shows a schematic representation of an electromagnetic radiation source in accordance with embodiments of the present invention.

FIG. 8 shows a schematic representation of the source 702 in accordance with embodiments of the present invention. The source 702 comprises a laser 802 and two star couplers 804 and 806. The laser 802 can be a racetrack, mode-locked laser that emits 64 different wavelengths of unmodulated electromagnetic radiation. Each wavelength or "channel" is represented by $\lambda_1, \lambda_2, \lambda_3, \ldots, \lambda_{64}$, and each channel has a relatively constant intensity. The star couplers 804 and 806 each comprise beam splitters configured in a tree structure that places the 64 channels onto each of 258 of the 270 on-chip waveguides 308, as shown in FIG. 8. In certain embodiments of the present invention, the laser 802 can be a hybrid III-V semiconductor/Si mode-locked laser that generates M+1 laser wavelengths. (See e.g., A. W. Fang et al., "Integrated AlGaInAs-silicon evanescent race track laser and photodetectors," *Optics Express* 15, 2315 (2007).)

The optical die 108 operates synchronously in epochs of 24 clock cycles. The available unencoded channels are grouped into logical channels that can send either a cache line, or a broadcast message, or a control message, in a single epoch. One logical channel can communicate one cache line or control message in one epoch. The grouping of channels into logical channels is done in a way that permits a cluster to receive and send up to one cache line every 4 (24 clock cycles/6 channels) clock cycles, yielding a total bandwidth of 10 Tbytes/s [64 clusters×(128 Bytes/4 clocks)×5 GHz].

Optoelectronic Converters

Figure 9B:
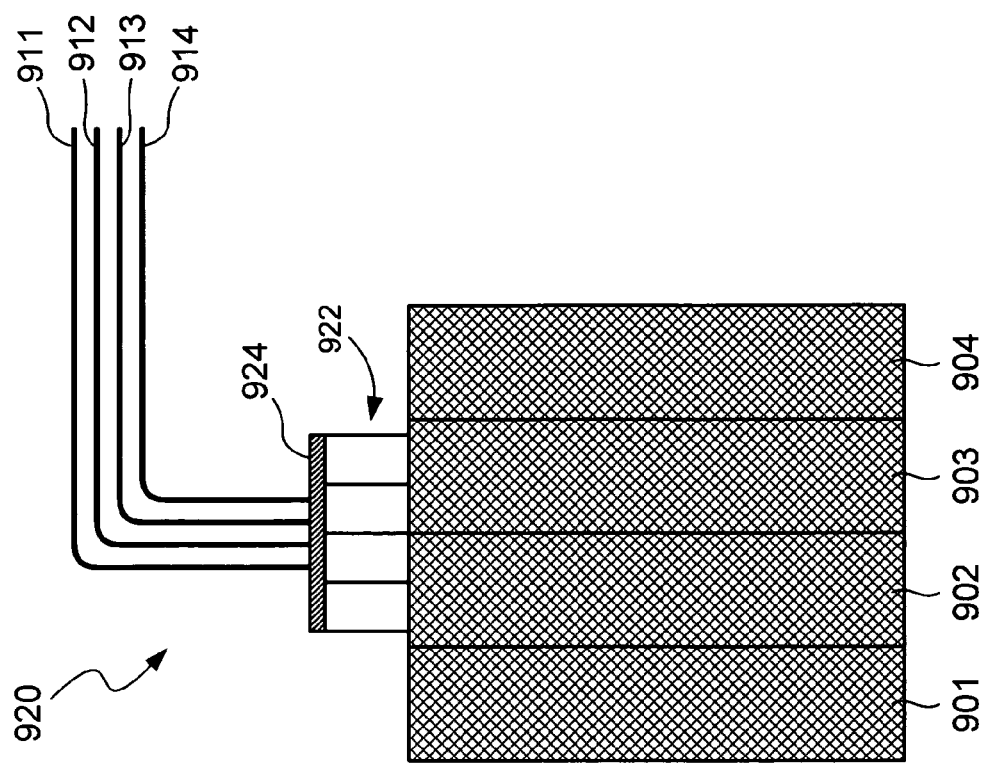
FIGS. 9A-9B show schematic representations of two optoelectronic converters in accordance with embodiments of the present invention.
Figure 9A:
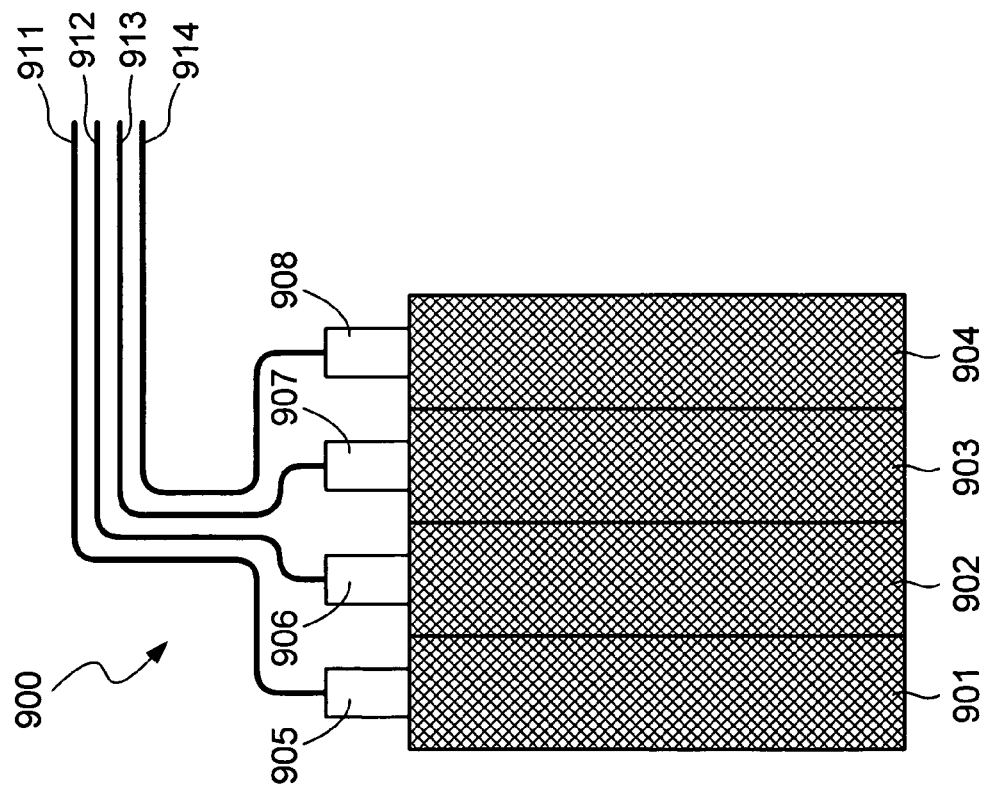

FIGS. 9A-9B show schematic representations of two types of optoelectronic converters in accordance with embodiments of the present invention. In FIG. 9A, a first optoelectronic converter 900 comprises four converter blocks 901-904 that are photonically coupled to four off-chip communications hubs 905-908. The communications hubs 905-908 are each photonically coupled to bundles 911-914, where each bundle comprises 8 off-chip waveguides. In FIG. 9B, a second optoelectronic converter 920 comprises the same four converter blocks 901-904 that are photonically coupled to off-chip communication hubs grouped into a single device 922. Bundles 911-914 are photonically coupled to the device 922 via a serialization/deserialization device 924.

Figure 10:
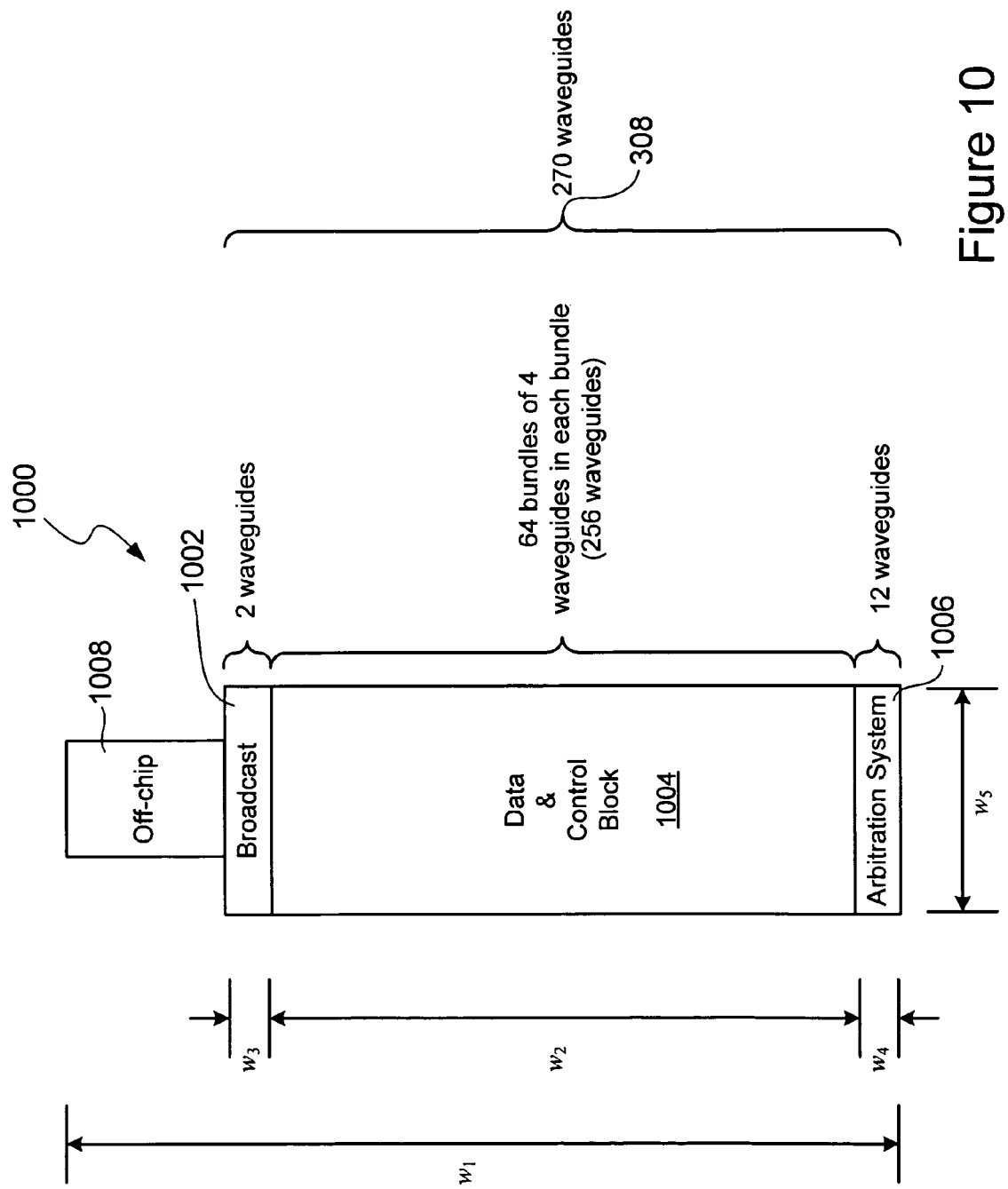
FIG. 10 shows a schematic representation of components of a converter block for an optoelectronic converter in accordance with embodiments of the present invention.

FIG. 10 shows a schematic representation of components of a converter block 1000 in accordance with embodiments of the present invention. The converter block 1000 comprises a broadcast system 1002, a data/control block 1004, an arbitration system 1006, and an off-chip communications hub 1008. The operation and architecture of the arbitration system 1600 are described in greater detail below with reference to FIGS. 18 and 19. The broadcast system 1002 allows the associated cluster to send data to all the other clusters at about the same time. The data/control block 1004 is dedicated to a particular tile of the memory-controller die 104 and converts encoded channels into encoded electrical signals that are transmitted to the particular tile and converts encoded electrical signals output from the tile into encoded channels that are transmitted to another cluster in the computational device. Architectural embodiments of the data/control block 1004 are described in greater below with reference to FIGS. 11-13. The arbitration system 1006 grants a cluster the right to use a cluster or bundle of waveguides in a given epoch. As shown in FIG. 10, two of the 270 on-chip waveguides 308 are dedicated to the broadcast system 1002, twelve of the on-chip waveguides 308 are dedicated to the arbitration system 1006, and 256 of the on-chip waveguides 308 are dedicated to the data/control block 1004. The 256 on-chip waveguides are arranged into 64 bundles. Each of the 64 bundle comprises 4 on-chip waveguides that are dedicated a particular tile in the memory die 102.

FIG. 10 also includes parameters $w_1, w_2, w_3, w_4$, and $w_5$ representing dimensions of components of the converter block 1000. In certain embodiments, $w_1$ can range from approximately 2100-2400 μm, $w_2$ can range from approximately 1700-2100 μm, $w_3$ can range from approximately 32-44 μm, $w_4$ can range from approximately 80-120 μm, and $w_5$ can range from approximately 500-600 μm. Preferably, $w_1$ can be approximately 2290 μm, $w_2$ can be approximately 1900 μm, $w_3$ can be approximately 38 μm, $w_4$ can be approximately 100 μm, and $w_5$ can be approximately 530 μm, but these dimensions and ranges can be varied depending on the implementation.

Figure 11:
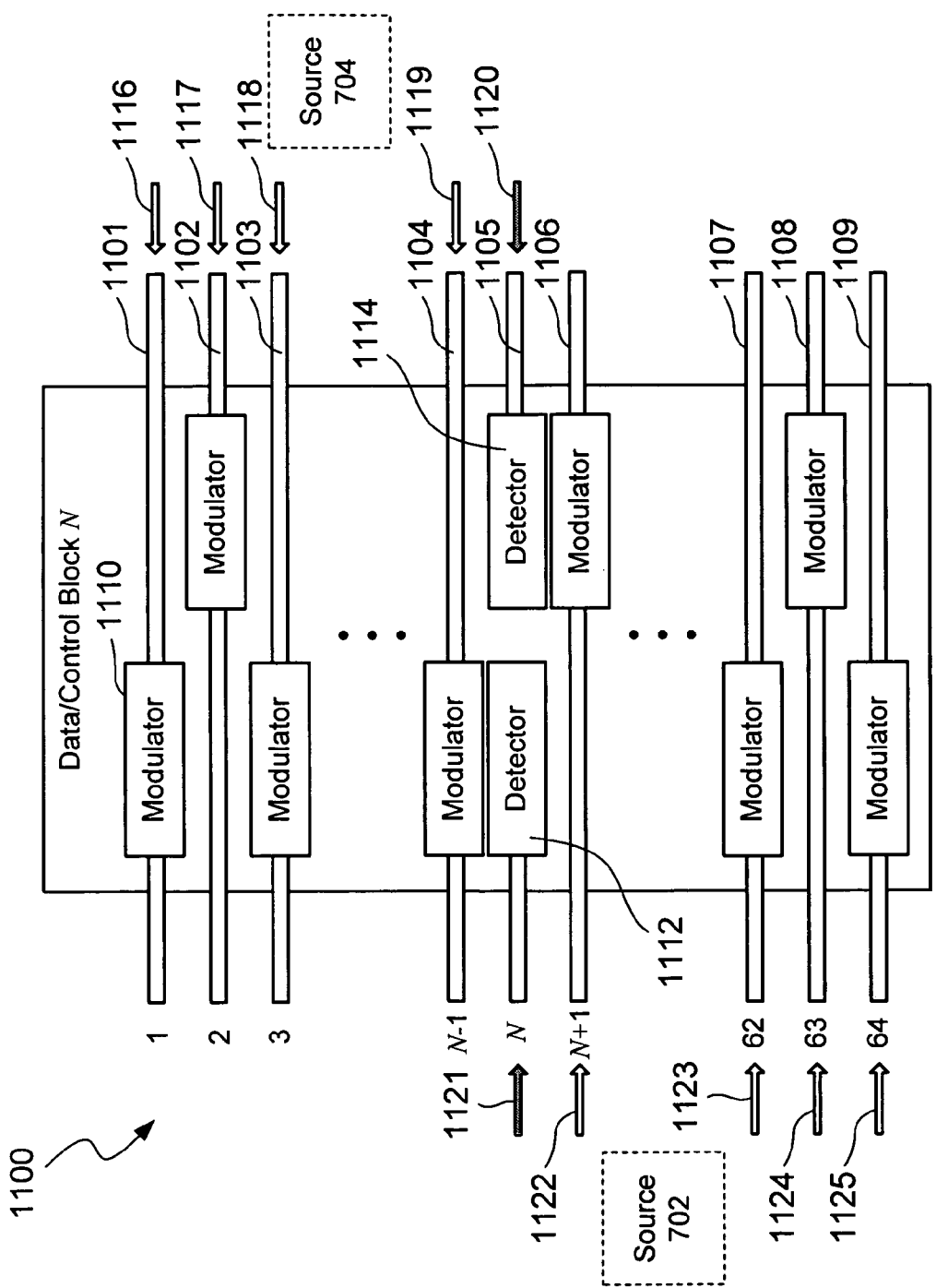
FIG. 11 shows a schematic representation of a data/control block of an optoelectronic converter in accordance with embodiments of the present invention.

FIG. 11 shows a schematic representation of a data/control block 1100 in accordance with embodiments of the present invention. The data/control block 1100 represents the Nth of the 64 data/control blocks in the optical die 102. Horizontal lines 1101-1109 represent only 9 of the 64 bundles of 4 on-chip waveguides associated with each of the 64 data/control blocks (the remaining 55 bundles are not shown). The bundles are also labeled 1 through 64 from top to bottom, each label corresponding to a particular data/control block. Each data/control block uses a particular bundle for receiving encoded channels output from the other 63 data/control blocks. The remaining 63 bundles are used by the data/control block to send encoded channels to the other 63 data/control blocks. For example, as shown in FIG. 11, the data/control block 1100 has 63 bundled waveguide modulators, such as bundled waveguide modulator 1110, that are photonically coupled to the bundles one through N−1 and the bundles N+1 though 64. The data/control block 1100 also has two bundled waveguide detectors 1112 and 1114 that are photonically coupled to the Nth bundle 1105. The data/control block 1100 receives 64 unencoded (i.e., unmodulated) channels in each of on-chip waveguides of the $1^{st}$ through N−1 bundles and the N+1 though the $64^{th}$ bundles from the sources 702 and 704.

As shown in FIG. 11, the data/control block 1100 is configured to use the unencoded channels provided by the source 702 to generate encoded channels that are destined for the data/control blocks N+1 though the $64^{th}$ and use the unencoded channels provided by the source 704 to generate encoded channels that are destined for the data/control blocks one through N−1. For example, as shown in FIG. 11, the data/control block 1100 receives unencoded channels on the bundles 1101-1104 originating from the source 704, as indicated by directional arrows 1116-1120, and uses the bundled waveguide modulators that are photonically coupled to the bundles 1101-1104 to encode data in these unencoded channels 1116-1120 that is destined for the data/control blocks one through N−1. On the other hand, the data/control block 1100 also receives unencoded channels on the bundles 1106-1109 originating from the source 702, as indicated by directional arrows 1121-1125, and uses the bundled waveguide modulators that are photonically coupled to the bundles 1106-1109 to encode data in the unencoded channels 1112-1125 that is destined for the data/control blocks N+1 through 64. The data/control block 1100 uses the bundled waveguide detectors 1112 and 1114 to receive encoded channels 1120 and 1121 sent by the other 63 data/control blocks.

Figure 12:
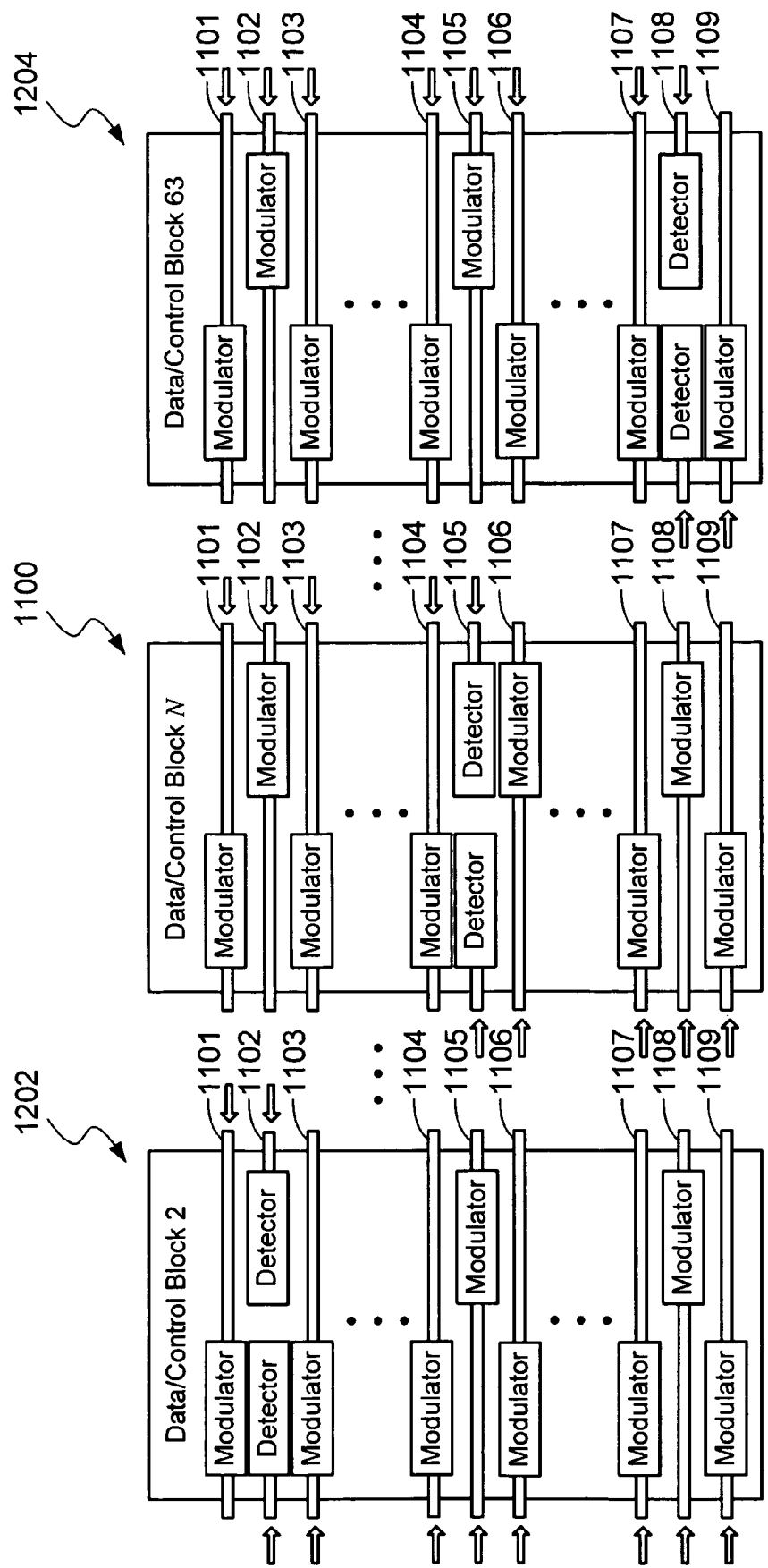
FIG. 12 shows a schematic representation of three data/control blocks in accordance with embodiments of the present invention.

FIG. 12 shows a schematic representation of three data/control blocks in accordance with embodiments of the present invention. As shown in FIG. 12, the second data/control block 1202 is configured to receive encoded channels on the second bundle 1102, and the $63^{rd}$ data/control block 1204 is configured to receive encoded channels on the $63^{rd}$ bundle 1108. The data/control blocks 1100 and 1204, and other data and control blocks not shown, use the bundle 1102 to send encoded channels to the second data/control block 1202. These encoded channels pass undisturbed through the data/control blocks located in between. The data/control blocks 1100 and 1202, and other data and control blocks not shown, use the bundle 1108 to send encoded channels to the $63^{rd}$ data/control block 1204. These encoded channels pass undisturbed through the data/control blocks located in between. The architecture and operation of the bundled waveguide modulators and detectors are described in greater detail below with reference to FIGS. 13 and 14.

Note that in other embodiments of the present invention, the data/control block 1100 can also be configured to use the unencoded channels provided by the source 702 to generate encoded channels that are destined for the data/control blocks 1 through N−1, and use the unencoded channels provided by the source 704 to generate encoded channels that are destined for the data/control blocks N+1 through 64.

The bundled waveguide modulator and the bundled waveguide detector are nearly identically configured devices. FIG. 13 shows a schematic representation of an enlarged bundled modulator/detector 1300 in accordance with embodiments of the present invention. As described above with reference to FIGS. 11-12, the bundled waveguide modulator/detector 1300 receives channels on a bundle of four on-chip waveguides 1301-1304. The bundled waveguide modulator/detector 1300 comprises four waveguide-microring systems, such as waveguide-microring system 1306. The four waveguide-microring systems include the approximately parallel waveguides 1301-1304, but the separation distance between the waveguides 1301-1304 can range from approximately 10-14 μm, which is larger than the separation distance between the bundled waveguides 1301-1304 outside the bundled waveguide modulator/detector 1300. Each waveguide-microring system includes 64 microrings, such as microring 1308. The 64 microrings are adjacent to and distributed on opposite sides along the length of each waveguide. Each of the microrings is configured to be resonant with one of the 64 channels transmitted along a photonically coupled waveguide. The configuration of the microrings is described below with reference to FIG. 17.

FIG. 13 also includes parameters $t_1$, $t_2$, $t_3$, and $t_4$ representing dimensions of components of the waveguide-microring system 1300. In certain embodiments, $t_1$ can range from approximately 45-65 μm, $t_2$ can range from approximately 200-300 μm, $t_3$ can range from approximately 0.5-5 μm, and $t_4$ can range from approximately 1-10 μm. Preferably, $t_1$ can be approximately 57.5 μm, $t_2$ can be approximately 255 μm, $t_3$ can be approximately 2 μm, and $t_4$ can be approximately 5 μm, but the invention is not limited to these dimensions or dimension ranges. These dimensions and dimension ranges can be varied depending on the implementation.

FIG. 14 shows an off-chip communications hub 1400 in accordance with embodiments of the present invention. The off-chip communications hub 1400 comprises an off-chip waveguide modulator 1401 and an off-chip waveguide detector 1402 with total dimensions of approximately 200-300 μm by approximately 100-200 μm, but the dimensions can be varied depending on the implementation. The off-chip waveguide modulator 1401 comprises four waveguide-microring systems 1403-1406. Each of the waveguide-microring systems 1403-1406 includes a portion of an off-chip waveguide and 64 microrings. The waveguides of the waveguide-microring systems 1403-1406 are photonically coupled to an on-chip waveguide 1407 via four beam splitters 1408-1411, respectively. The waveguide 1407 carries 64 unencoded channels that are placed by the beam splitters 1408-1411 into the waveguide-microring systems 1403-1406 which are then used to encode data into the 64 unencoded channels generated by four corresponding tiles, as described below with reference to FIG. 15A. The off-chip waveguide detector 1402 comprises four waveguide-microring systems 1412-1415 that also include four off-chip waveguides for receiving encoded channels from external devices, such as off-chip memory. The waveguide-microring systems 1412-1415 are used to convert the encoded channels into corresponding encoded electrical signals that are transmitted to four electronically couple tiles.

Figure 15:
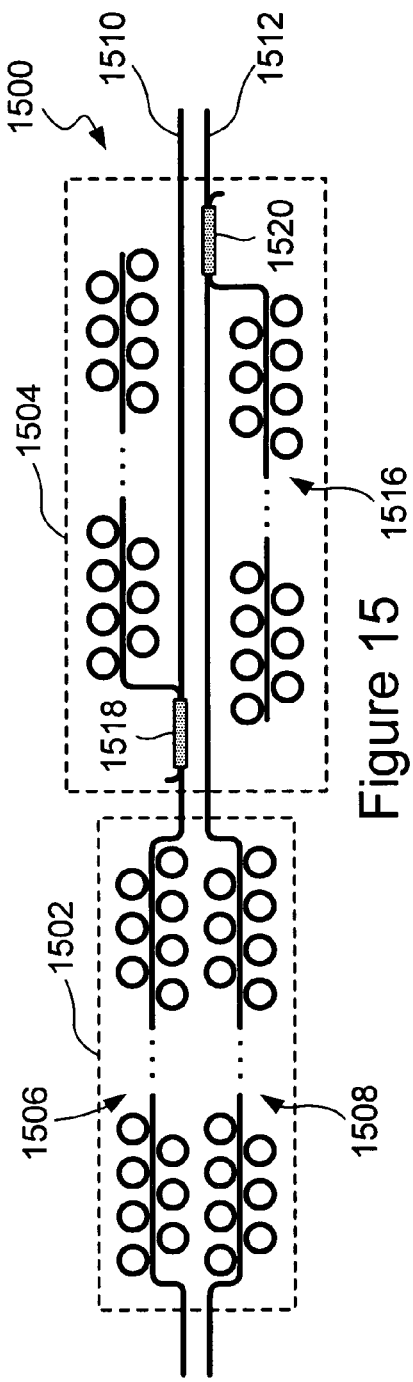
FIG. 15 shows a broadcast in accordance with embodiments of the present invention.

FIG. 15 shows a broadcast system 1500 in accordance with embodiments of the present invention. The broadcast 1500 comprises a broadcast modulator 1502 and a broadcast detector 1504 with area dimensions of approximately 400-600 μm by 20-40 μm, but the dimensions can be varied depending on the implementation. The broadcast modulator 1502 comprises two waveguide-microring systems 1506 and 1508 that are photonically coupled to two on-chip waveguides 1510 and 1512, respectively. The broadcast detector 1504 comprises two waveguide-microring systems 1514 and 1516 that are photonically coupled to the waveguides 1510 and 1512 via beam splitters 1518 and 1520, respectively. The broadcast system 1500 is used to send data to and receive data from all the other clusters at approximately the same time.

Note that although optoelectronic converter embodiments of the present invention have been described above with reference to FIG. 9-15 for a 64 cluster computational device embodiments of the present invention are not so limited. One skilled in the art will immediately recognize that these embodiments can be scaled up or down to accommodate computational devices having any number of clusters.

Operation of Waveguide-Microring Systems

Figure 16A:
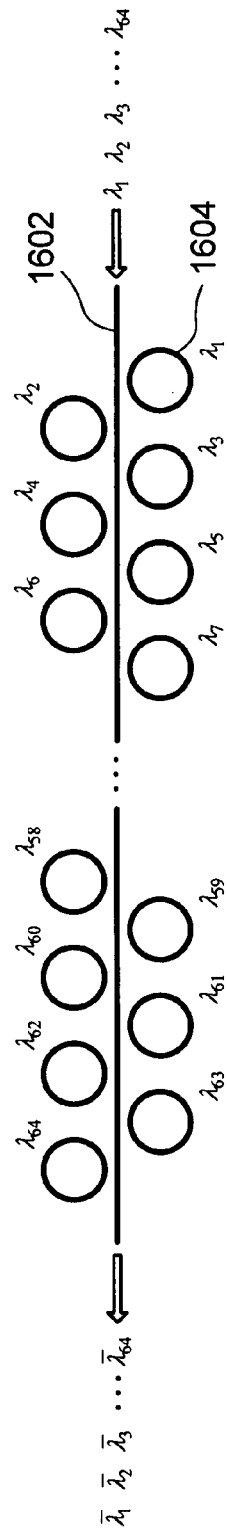
FIG. 16A shows a waveguide-microring system used to encode data in unencoded channels in accordance with embodiments of the present invention.

FIG. 16A shows a waveguide-microring system that can be used to encode data in 64 unencoded channels in accordance with embodiments of the present invention. In FIG. 16A, 64 unencoded (i.e., unmodulated) channels $\lambda_1, \lambda_2, \lambda_3, \ldots, \lambda_{64}$ are carried by a waveguide 1602. Each of the 64 microrings is configured to have resonance with one of the channels so that each channel can be extracted via evanescent coupling into an associated adjacent microring. For example, microring 1604 is configured to be resonant with the channel $\lambda_1$. As the channel $\lambda_1$ is transmitted along the waveguide 1602, much of the channel $\lambda_1$ is evanescently coupled into the microring 1604. Information can be encoded in the intensities of channels by applying a pattern of "on" and "off" voltages to the microrings. The voltage shifts the refractive index of the microrings, which, in turn, modulates the intensity of a channel transmitted along the waveguide 1602. The pattern of voltages may correspond to a string of data output from a corresponding tile in the memory-controller die 104. For example, an appropriate "on" voltage produced by a tile of the memory-controller die 104 may correspond to the binary number "1," and the "off" voltage may correspond to the binary number "0." When the "on" voltage is applied to a microring, the resonance of the microring is shifted and the corresponding channel transmitted along the adjacent waveguide is not evanescently coupled into the microring. In other words, while the "on" voltage is applied, the intensity of the channel remains relatively unchanged as the channel passes the microring. However, as soon as the voltage is turned "off," the channel is evanescently coupled into the microring and the intensity of the channel passing the microring drops. As a result, the same data encoded in a pattern of "on" and "off" voltages can be encoded in the intensity of the channel where relatively high intensities correspond to the binary number "1" and relatively low intensities correspond to the binary number "0."

Figure 16B:
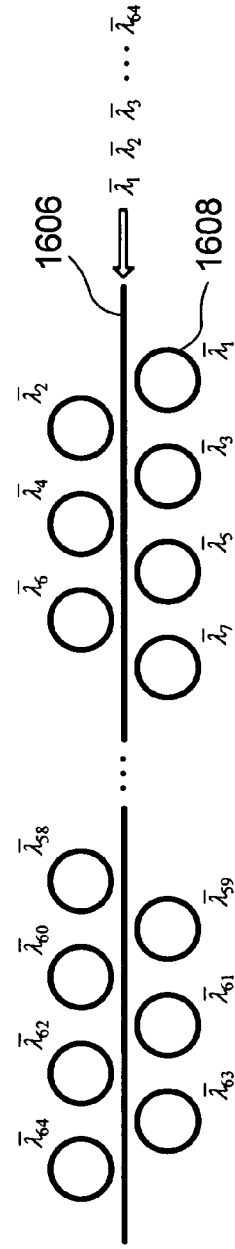
FIG. 16B shows a waveguide-microring system used to extract encoded channels from a waveguide in accordance with embodiments of the present invention.

FIG. 16B shows a waveguide-microring system that can be used to extract 64 encoded channels from a waveguide in accordance with embodiments of the present invention. In FIG. 16B, 64 encoded channels $\bar{\lambda}_1, \bar{\lambda}_2, \bar{\lambda}_3, \ldots, \bar{\lambda}_{64}$ are input to a waveguide 1606 of a detector block. Each of the 64 microrings is configured to have resonance with one of the 64 channels so that each channel can be extracted via evanescent coupling into an adjacent microring. For example, as the encoded channel $\bar{\lambda}_1$ is transmitted along the waveguide 1606, high and low intensity associated with the channel $\bar{\lambda}_1$ are evanescently coupled into a microring 1608. The pattern of relatively high and low intensities associated with the channel $\bar{\lambda}_1$ creates a corresponding pattern of high and low voltages across the microring 1608. This pattern of voltages is then transmitted as an electrical signal encoding the same information to an associated tile in the memory-controller die 104.

Microrings

FIG. 17 shows a schematic representation of a microring 1700 in accordance with embodiments of the present invention. The microring 1700 is positioned in close proximity to a waveguide 1702. In certain embodiments, the microring 1700 comprises an intrinsic semiconductor, has a p-type semiconductor region 1704 formed in the semiconductor substrate interior of the microring 1700, and an n-type semiconductor region 1706 formed in the semiconductor substrate surrounding the outside of the microring 1700 and on the opposite side of the waveguide 1702. The regions 1704, 1706, and the microring 1700 form a p-i-n junction that can be used as a photodiode or a modulator, as described above with reference to FIG. 16. The waveguide 1702 can be an on-chip or an off-chip waveguide as described above with reference to FIGS. 13-15. The transmission of the waveguide 1702 may be sensitive to the channel wavelength and may be greatly reduced when the channel is at resonance with the microring 1700 because the channel evanescently couples into the microring 1700. The resonance of the microring 1700 can be modulated electronically by applying an appropriate voltage or current to the regions 1704 and 1706. The microring 1700 can be configured so that when no voltage or current is applied to the microring, a particular channel has resonance with the microring 1700 and evanescently couples into the microring 1700. When an appropriate voltage or current is applied to the microring 1700, the resonance of the microring 1700 is shifted and the same channel propagates through the waveguide 1702 undisturbed. On the other hand, the microring 1700 can also be configured so that when a voltage or current is applied to the microring 1700, a particular channel has resonance with the microring 1700 and evanescently couples into the microring 1700. When the voltage or current is turned "off," the resonance of the microring 1700 is shifted and the same channel propagates through the waveguide 1702 undisturbed. For an example of microring modulators see Q. Xu, et al., "12.5 Gbit/s carrier-injection-based silicon microring silicon modulators," *Optics Express* 15, 430 (2007).

Arbitration

The clusters can operate as resources as well as requesters for other resources. However, it may be the case that two or more clusters request access to the same resource, such as a particular cluster, during the same epoch. Each cluster of the present invention is electronically coupled to a corresponding arbitration system in order to avoid these kinds of conflicts. For the sake of brevity and simplicity, the following description of performing arbitration is described using a schematic representation of an exemplary computational device comprising just four clusters in accordance with embodiments of the present invention. Subsequently, a description of an arbitration system embodiment is described below with reference to FIG. 19.

Figure 18A:
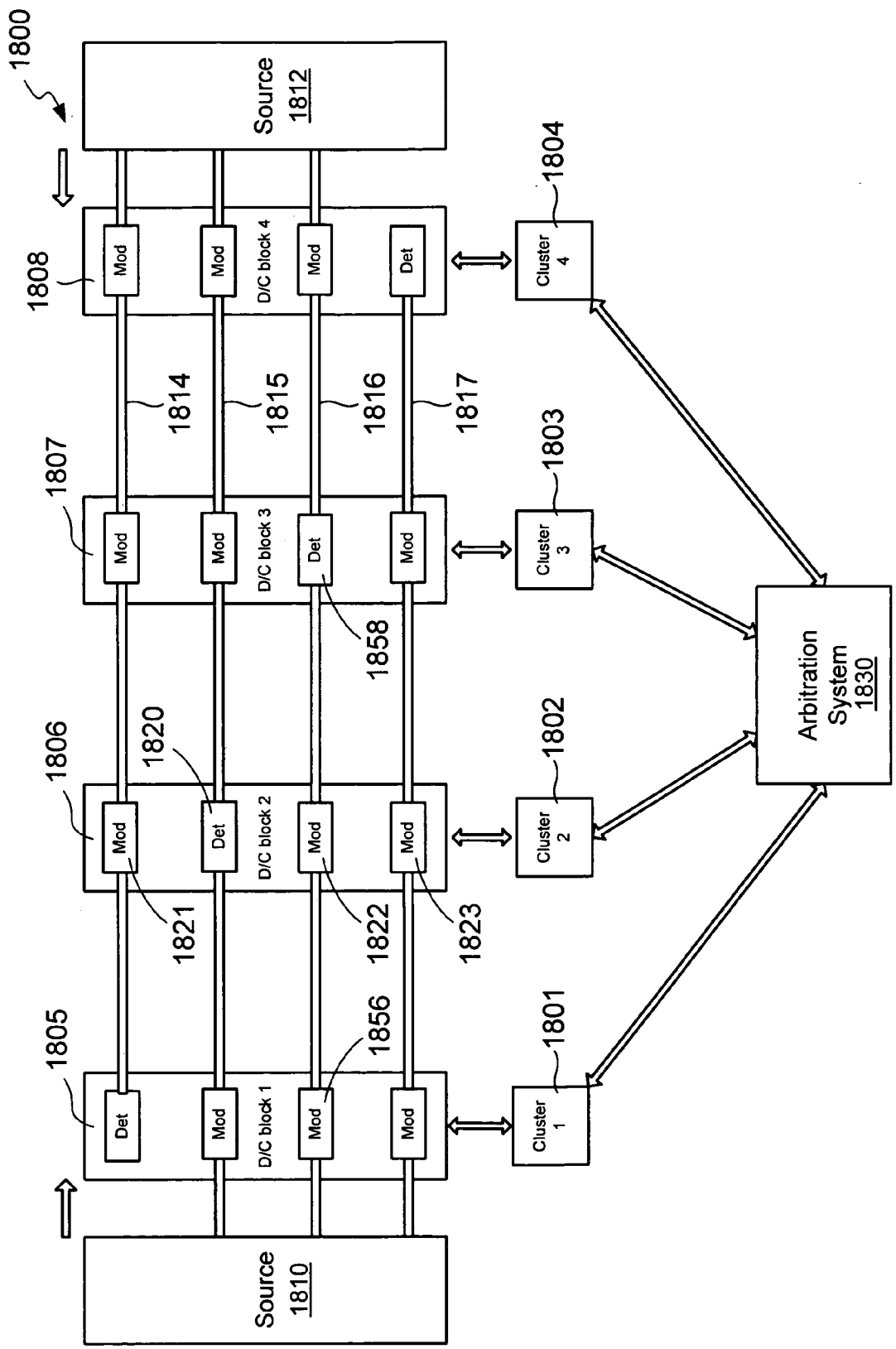
FIG. 18A shows a schematic representation of an exemplary four-cluster, stacked computational device in accordance with embodiments of the present invention.

FIG. 18A shows a schematic representations of an exemplary four-cluster, stacked computational device 1800 in accordance with embodiments of the present invention. The computational device 1800 includes four clusters 1801-1804 that are in electronic communication with four corresponding data/control blocks 1805-1808. The computational device 1800 also includes a first source 1810 and a second source 1812. The sources 1810 and 1812 can be configured to emit 64 unencoded channels $\lambda_1, \lambda_2, \lambda_3, \ldots, \lambda_{64}$ onto each waveguide of the four bundles of waveguides 1814-1817, as described above with reference to FIG. 8. The data/control blocks each receive data and control channels on a particular bundle and use the remaining channels to send data and control channels to the other clusters. For example, the data/control block 1806 includes a bundled waveguide demodulator 1820 and three bundled waveguide modulators 1821-1823 that are configured and operated as described above with FIGS. 11-12. The clusters 1801-1804 are each in electronic communication with an arbitration system 1830.

Figure 18B:
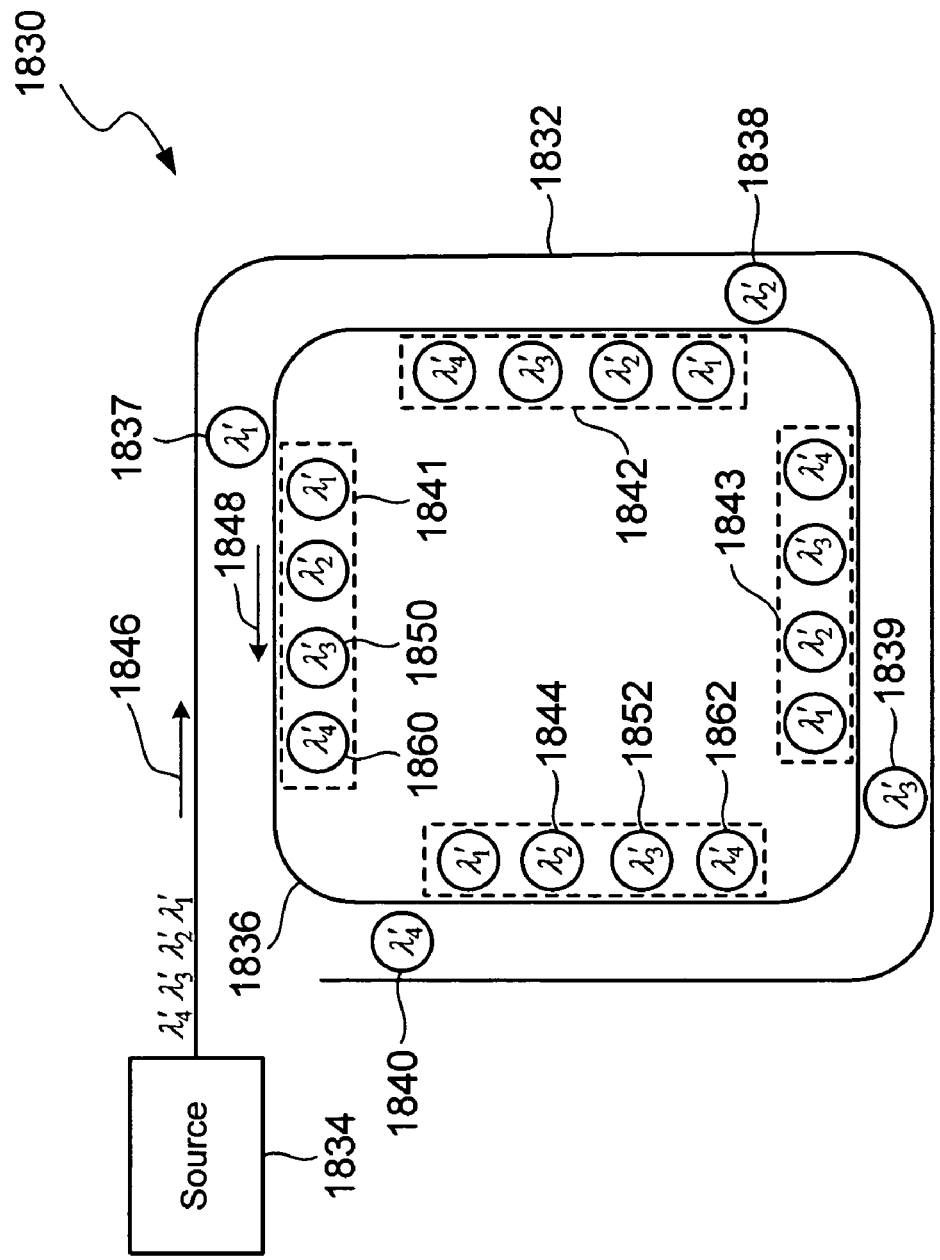
FIG. 18B shows a schematic representation of an arbitration system, shown in FIG. 18A, in accordance with embodiments of the present invention.

FIG. 18B shows a schematic representation of the arbitration system 1830 in accordance with embodiments of the present invention. The arbitration system 1830 comprises a power waveguide 1832 photonically coupled to a source 1834, a loop waveguide 1836 in photonic communication with the power waveguide 1832, and via four microrings 1837-1840. The arbitration system 1830 also includes 4 groups of 4 interior microrings 1841-1844 located within the loop waveguide 1836. The source 1834 emits four unmodulated channels $\lambda_1'$, $\lambda_2'$, $\lambda_3'$, and $\lambda_4'$ onto the power waveguide 1832. Each of the microring groups 1841-1844 is in electronic communication with one of the four clusters 1801-1804. In particular, the microrings of the microring group 1841 are in electronic communication with the cluster 1 1801, the microrings of the microring group 1842 are in electronic communication with the cluster 2 1802, the microrings of the microring group 1843 are in electronic communication with the cluster 3 1803, and the microrings of the microring group 1844 are in electronic communication with the cluster 4 1804. The interior microrings are configured as p-i-n junction photodiodes, as described above with reference to FIG. 17. Note that for the 64-cluster computational device 100, there is no need for a separate source 1834, as described below with reference to FIG. 19.

As shown in FIG. 18B, the four microrings 1837-1840 and the interior microrings 1841-1844 are each labeled with the channel designations $\lambda_1'$, $\lambda_2'$, $\lambda_3'$, and $\lambda_4'$. These designations identify the channel each microring has resonance with and can evanescently couple from an adjacent waveguide. For example, the microrings 1837-1844 are each separately configured to have resonance with only one of channels $\lambda_1'$, $\lambda_2'$, $\lambda_3'$, and $\lambda_4'$, respectively. In particular, the microrings 1837-1840 evanescently couple the channels $\lambda_1'$, $\lambda_2'$, $\lambda_3'$, and $\lambda_4'$, respectively, from the clockwise direction 1846 in the power waveguide 1832 onto the counterclockwise direction 1848 in the loop waveguide 1836.

In the same manner, the inner microrings 1841-1844 also evanescently couple particular channels from the loop waveguide 1836, but the inner microrings must be activated or turned "on" by a corresponding cluster. For example, the microrings 1841 can all be configured to be ½ a mode off of the resonance frequency of the channels $\lambda_1'$, $\lambda_2'$, $\lambda_3'$, and $\lambda_4'$. As a result, the channels $\lambda_1'$, $\lambda_2'$, $\lambda_3'$, and $\lambda_4'$ pass the microrings 1841 undisturbed along the loop waveguide 1836. However, the corresponding cluster 1 1801 can send an appropriate current to activate a particular microring shifting the microring into resonance with an associated channel. The microring can then evanescently couple the channel from the loop waveguide 1836 to resonate within the microring. For example, the cluster 1 1801 can turn "on" the microring 1850 so that the channel $\lambda_3'$ is evanescently coupled from the loop waveguide 1836 to resonate within the microring 1850. Unless the other microrings within the group 1841 are turned "on," the channels $\lambda_1'$, $\lambda_2'$, and $\lambda_4'$ pass undisturbed.

Using the arbitration system 1830 to determine whether one of the four clusters 1801-1804 is available for receiving data is now described with reference to FIGS. 18A and 18B. Just prior to each epoch, each cluster is assigned one of the four channels emitted from the source 1834, and the clusters 1801-1804 are aware of the cluster-to-channel assignments. These assignments can be random or based on a method that ensures a fair utilization of the clusters and can made during the epoch (in an exemplary implementation ⅓ of an epoch) prior to the start of a new epoch. These cluster-to-channel assignments are used by the clusters to determine which clusters are available for receiving data for further processing. In one embodiment, the channel assignments per epoch can be predetermined initially and stored in a look-up table accessible at each cluster, and computer logic used to update the cluster-to-channel assignments per epoch in accordance with a scheme. An example of such a scheme is a round robin scheme.

In one embodiment, the arbiter is spread over several die. The x-bar connections on the memory controller die 104 determines what to request from the arbiter. The request is conveyed through the analog die 106 to the optical die 108 in which the ring modulators and waveguides sit. The attempt it made on the optical die 108 to divert a channels and that channel is either diverted and detected or not. The resulting electrical signal makes it back down to the x-bar connections which interprets electrical signal as a go or no-go to use the logical channel by sending data to the modulators on the next epoch.

Consider, for example, a cluster-to-channel assignment show in Table I prior to the start of an epoch:

TABLE I

| Cluster No. | Channel |
|---|---|
| 1 | $\lambda_1'$ |
| 2 | $\lambda_2'$ |
| 3 | $\lambda_3'$ |
| 4 | $\lambda_4'$ |

As displayed in Table I, the cluster 1 1801 has been assigned the channel $\lambda_1'$, the cluster 2 1802 the channel $\lambda_2'$, and so on. Suppose cluster 1 1801 and cluster 4 1804 both want to use cluster 3 1803 to process data. Returning to FIG. 18B, the cluster 1 1801 turns "on" the microring 1850 and the cluster 4 1804 also turns on the microring 1852. The channel $\lambda_3'$ is evanescently coupled from the power waveguide 1832 via the microring 1839 onto the loop waveguide 1836, where the channel $\lambda_3'$ then propagates along the loop waveguide 1836 in a counterclockwise direction 1848 just after the microring 1839. The microring 1850 extracts the channel $\lambda_3'$ from the loop waveguide 1836 before the channel $\lambda_3'$ can reach the microring 1852. The channel $\lambda_3'$ resonating in the microring 1850 generates an electrical signal that is sent to the cluster 1 1801. Returning to FIG. 18A, when this electrical signal exceeds a threshold, it is detected in the cluster 1 1801. Having detected this signal, the cluster 1 1801 transmits during the subsequent epoch the data to the modulators 1856 which encode the data in unmodulated channels output from the source 1810. These encoded (i.e., modulated) channels are then streamed along the bundle 1816 to the detectors 1858 and processed by the cluster 3 1803, as describe above with reference to FIG. 12. In this particular epoch, the cluster 1 1801 gets access to the cluster 3 1803 and the cluster 4 1804 has to wait for a subsequent epoch.

Now suppose that cluster 1 1801 and cluster 4 1804 both want to again use cluster 3 1803 to process data. But in this case, suppose that the cluster-to-channel assignments are as show in Table II prior to the start of an epoch:

TABLE II

| Cluster No. | Channel |
|---|---|
| 1 | $\lambda_3'$ |
| 2 | $\lambda_1'$ |
| 3 | $\lambda_4'$ |
| 4 | $\lambda_2'$ |

As displayed in Table II, the cluster 3 1803 has now been assigned the channel $\lambda_4'$. Returning to FIG. 18B, the cluster 1 1801 turns "on" the microring 1860, and the cluster 4 1804 also turns "on" the microring 1862. The channel $\lambda_4'$ is evanescently coupled from the power waveguide 1832 via the microring 1840 onto the loop waveguide 1836, where the channel $\lambda_4'$ then propagates along the loop waveguide 1836 in the counterclockwise direction 1848 just after the microring 1840. However, prior to this epoch, the microring 1862 extracts the channel $\lambda_4'$ from the loop waveguide 1836 before the channel $\lambda_4'$ can reach the microring 1860. The channel $\lambda_4'$ resonates in the microring 1862 and generates an electrical signal that is sent to the cluster 4 1804. Now returning to FIG. 18A, when this electrical signal exceeds a threshold, the cluster 4 1804 detects this signal. Having detected this signal, cluster 4 1804 transmits during the subsequent epoch the data to the cluster 3 1803 for processing as described above. In this particular epoch, the cluster 4 1804 gets access to the cluster 3 1803 and the cluster 1 1801 has to wait for a subsequent epoch.

Figure 19:
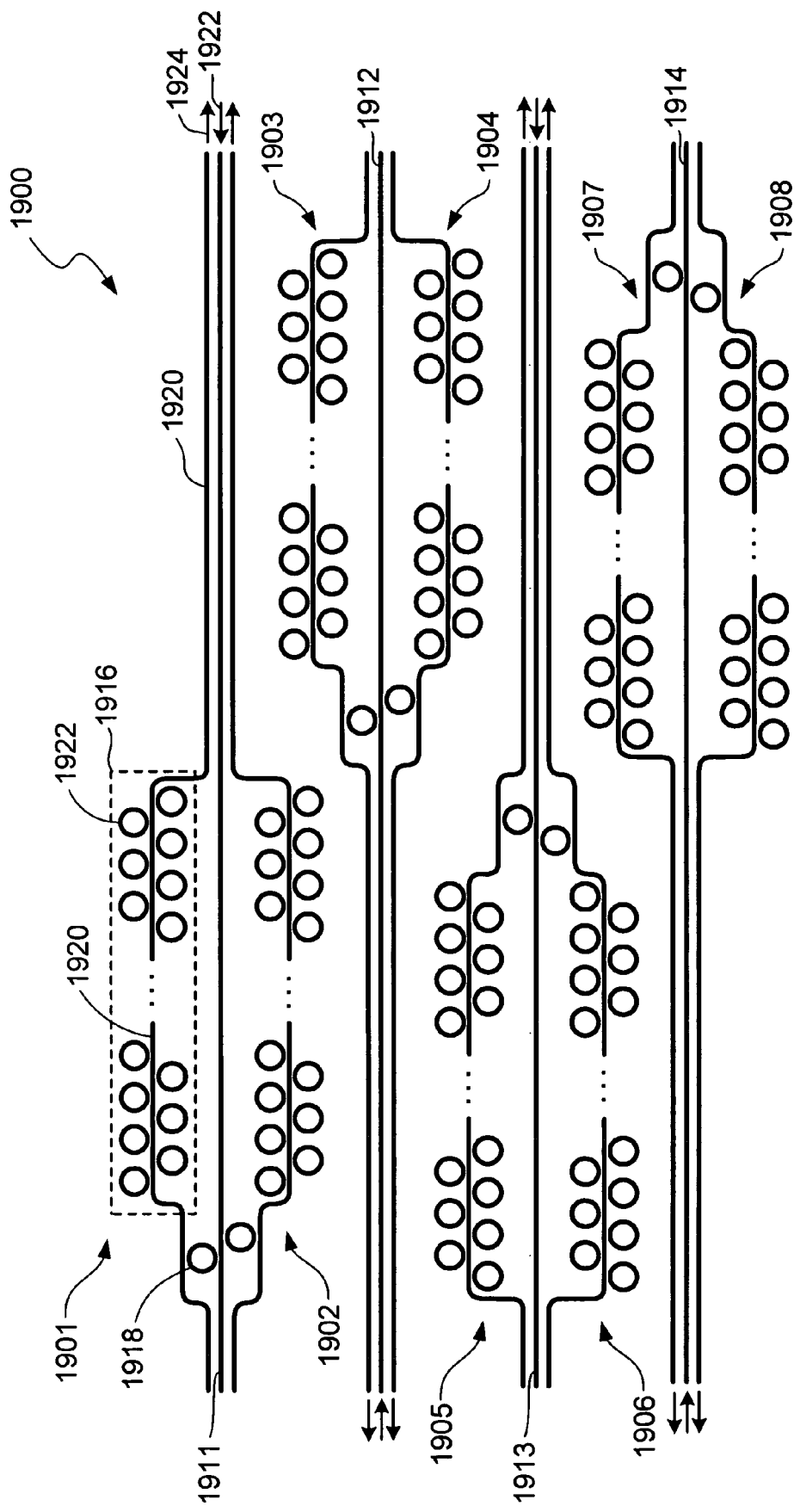
FIG. 19 shows an arbitration system in accordance with embodiments of the present invention.

FIG. 19 shows an arbitration system 1900 corresponding to an associated cluster N in accordance with embodiments of the present invention. The arbitration system comprises eight arbiters 1901-1908. Each arbiter comprises a waveguide-microring system and a microring that is photonically coupled to one of four central waveguides 1911-1914. For example, the arbiter 1901 comprises a waveguide-microring system 1916 and a microring 1918 photonically coupled to the central waveguide 1911. The arbiter 1901 can be used by the cluster N to determine whether a requested cluster M is available for receiving data, and other arbiters (not shown) connected to the same waveguide 1920 do the same for their associated clusters.

For the sake of simplicity, assume that the arbitration system 1900 represents one of the 64 arbitration systems of the computer device 100, such as the arbitration system 1006, shown in FIG. 10. Assume that all 64 clusters use the arbiters connected to the waveguide 1920 to determine which cluster is available for receiving data. A source, such as the sources 702 or 704, places the 64 channels $\lambda_1, \lambda_2, \lambda_3, \ldots, \lambda_{64}$ into the waveguide 1911 in the direction 1922. Each arbiter includes a microring, such as microring 1918, that extracts one of the channels $\lambda_1, \lambda_2, \lambda_3, \ldots, \lambda_{64}$ from the power waveguide 1911 and places the corresponding channel onto the waveguide 1920 to propagate in the direction 1924. For example, the microring 1918 can be configured to extract the channel $\lambda_N$ from the power waveguide 1911. The 64 microrings of the waveguide-microring system 1916 are each configured to extract one of the 64 unmodulated channels $\lambda_1, \lambda_2, \lambda_3, \ldots, \lambda_{64}$ carried by the waveguide 1920 when an appropriate current is applied. Now suppose the cluster N wants to send data to the cluster M to be processed during the next epoch. During that last ⅓ of the previous epoch, the cluster N determines that cluster M has been assigned the channel $\lambda_{63}$ in the cluster-to-channel assignment. The cluster N responds by turning "on" the microring 1922. Because the microring 1918 is configured to extract only the channel $\lambda_N$, the channel $\lambda_{63}$ is extracted from the power waveguide 1911 by a different arbiter (not shown) connected to the waveguide 1920 and the channel $\lambda_{63}$ is transmitted back along the waveguide 1920 in the direction 1924. Provided the channel $\lambda_{63}$ is not intercepted by an arbiter of cluster that would also like to use cluster M to process data, the channel $\lambda_{63}$ is extracted via evanescent coupling into the microring 1922 which generates an electrical signal above threshold. The cluster N responds by transmitting data to the cluster M as described above with reference to FIG. 12. If the channel $\lambda_{63}$ is extracted by another cluster K before the channel $\lambda_{63}$ reaches the microring 1922, then the cluster K can transmit data to the cluster M for processing, and the cluster N waits for next cluster-to-channel assignment and the next epoch.

Note that although the operation of one of the eight arbiters 1901-1908 has been described, a number of the other arbiters can be used to determine whether other clusters are available and can be used to determine whether external devices are available. These determinations can be made at different times during an epoch.

As discussed above, in addition to the illustrative example of a multi-core computational device, the photonic interconnect can be implemented in other computer system devices, for example a memory system device which can also have the three-dimensional stacking and multiple memory controllers.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A photonic interconnect comprising:
   a plurality of on-chip waveguides disposed on the surface of a substrate;
   a plurality of off-chip waveguides disposed on the surface of the substrate;
   a first source disposed on the surface of the substrate and coupled to a first end of each of the on-chip waveguides; and
   a second source disposed on the surface of the substrate and coupled to a second end of each of the on-chip waveguides; and
   at least one optoelectronic converter disposed on the surface of the substrate, the at least one optoelectronic converter photonically coupled to a portion of the plurality of on-chip waveguides and a portion of the plurality of off-chip waveguides and in electronic communication with at least one computer system component, wherein the optoelectronic converter encodes information generated by the at least one computer system component in unmodulated electromagnetic radiation generated by the first and second sources and converts modulated electromagnetic radiation into electrical signals that can be processed by the at least one computer system component.

2. The photonic interconnect of claim 1 wherein the first source and the second source further comprise:
   a laser configured to emit a plurality of channels; and
   at least one star coupler photonically coupled to the laser and configured to receive a plurality of channels and output the plurality of channels into each of the on-chip waveguides.

3. The photonic interconnect of claim 2 wherein the laser further comprises a hybrid III-V semiconductor/silicon mode-locked laser.

4. The photonic interconnect of claim 1 wherein the plurality of on-chip waveguides and the plurality of off-chip waveguides further comprise approximately parallel ridge waveguides or approximately parallel photonic crystal waveguides.

5. The photonic interconnect of claim 4 further comprises at least one optical fiber interconnect photonically coupled to a portion of the plurality of off-chip waveguides and configured to send and receive at least one channel.

6. The photonic interconnect of claim 1 wherein the on-chip and off-chip waveguides have cross-sectional dimensions ranging from approximately 0.25 µm to approximately 0.5 µm.

7. The photonic interconnection of claim 1 wherein the at least one optoelectronic converter further comprises a serialization/deserialization device.

8. The photonic interconnect of claim 1 wherein the at least one optoelectronic converter further comprises at least one optoelectronic converter block in electronic communication with the at least one computer system component.

9. The photonic interconnection of claim 8 wherein the at least one optoelectronic converter block further comprises dimensions ranging from approximately 2100-2400 µm by approximately 500-600 µm.

10. The photonic interconnection of claim 8 wherein the at least one optoelectronic converter block further comprises:
    an off-chip communication hub photonically coupled to an on-chip waveguide and configured to modulate a plurality of channels in accordance with data encoded electrical signals generated by the at least one computer system component and to receive encoded channels via at least one off-chip waveguide and convert the encoded channels into data encoded electrical signals for processing by the at least one computer system component;
    a data/control block photonically coupled to a first portion of the plurality of on-chip waveguides configured to receive and modulate a plurality of unmodulated channels transmitted along a first bundle of the plurality of on-chip waveguides and to receive a plurality of encoded channels transmitted along a second bundle of the plurality of on-chip waveguides and generate corresponding data encoded electrical signals for processing by the at least one computer system component;
    an arbitration system photonically coupled to a second portion of the plurality of on-chip waveguides and configured to manage distribution of data between computer system components; and
    a broadcast system photonically coupled to a third portion of the plurality of on-chip waveguides and configured to send data to and receive data from all the other computer system components at approximately the same time.

11. The photonic interconnect of claim 1 wherein the at least one optoelectronic converter further comprises:
    at least one waveguide; and
    a plurality of microrings photonically coupled to the at least one waveguide, each microring configured to have resonance with each channel of a plurality of channels transmitted through the at least one waveguide.

12. The photonic interconnect of claim 11 wherein the plurality of microrings photonically coupled to the waveguide further comprises a first portion of the plurality of microrings positioned adjacent to the waveguide and a second portion of the plurality of microrings positioned adjacent to the waveguide.

13. The photonic interconnect of claim 11 wherein each microring further comprises an n-type semiconductor region located within the microring and a p-type semiconductor region located outside the microring, or a p-type semiconductor region located within the microring and an n-type semiconductor region located outside the microring.

14. The photonic interconnect of claim 11 further comprises:
    the microrings ranging in diameter from approximately 1 µm to approximately 10 µm; and
    the microrings are spaced from approximately 0.5 µm to approximately 5 µm apart.

15. The photonic interconnect of claim 11 wherein each microring is configured to extract a particular channel from the waveguide via evanescent coupling.

16. The photonic interconnect of claim 1 wherein the at least one optoelectronic converter in electronic communication with at least one computer system component further comprises transmitting analog electrical signals between the at least one optoelectronic converter and the at least one computer system component.

17. The photonic interconnect of claim 1 wherein the optoelectronic converter in electronic communication with at least one computer system component further comprises at least one through vias electronically coupled to the optoelectronic converter and the at least one compute system component.

18. The photonic interconnect of claim 1 wherein the through vias further comprises the vias extending through an analog electronics die positioned between the photonic interconnect and the at least one computer system component.

19. The photonic interconnect of claim 18 wherein the vias extending through the analog electronics die further comprise one of:
    metalized vias; or
    through silicon vias.

* * * * *

UNITED STATES PATENT AND TRADEMARK OFFICE
CERTIFICATE OF CORRECTION

| | | |
|---|---|---|
| PATENT NO. | : 7,532,785 B1 | Page 1 of 1 |
| APPLICATION NO. | : 11/975974 | |
| DATED | : May 12, 2009 | |
| INVENTOR(S) | : Raymond G. Beausoleil et al. | |

It is certified that error appears in the above-identified patent and that said Letters Patent is hereby corrected as shown below:

In column 1, line 53, delete "compute" and insert -- computer --, therefor.

In column 20, line 39, in Claim 17, delete "compute" and insert -- computer --, therefor.

Signed and Sealed this

Fifteenth Day of September, 2009

David J. Kappos
*Director of the United States Patent and Trademark Office*